US006865668B1

(12) United States Patent
Beneš et al.

(10) Patent No.: US 6,865,668 B1
(45) Date of Patent: Mar. 8, 2005

(54) VARIABLE-LENGTH, HIGH-SPEED ASYNCHRONOUS DECODER CIRCUIT

(75) Inventors: Martin Beneš, Berkely, CA (US); Steven M. Nowick, New York, NY (US); Andrew Wolfe, Los Gatos, CA (US)

(73) Assignee: Trustees of Columbia University in the City of New York, New York, NY (US)

( * ) Notice: Subject to any disclaimer, the term of this patent is extended or adjusted under 35 U.S.C. 154(b) by 0 days.

(21) Appl. No.: 09/787,168

(22) PCT Filed: Sep. 30, 1998

(86) PCT No.: PCT/US98/20397

§ 371 (c)(1),
(2), (4) Date: Dec. 6, 2001

(87) PCT Pub. No.: WO00/16486

PCT Pub. Date: Mar. 23, 2000

Related U.S. Application Data

(60) Provisional application No. 60/100,406, filed on Sep. 15, 1998.

(51) Int. Cl.[7] .............................. G06F 7/00; H03M 7/40

(52) U.S. Cl. ........................ 712/300; 712/208; 341/65; 341/67

(58) Field of Search ............................... 712/300, 208; 341/65, 67

(56) References Cited

U.S. PATENT DOCUMENTS 5,121,003 A * 6/1992 Williams .................... 326/121
5,784,631 A * 7/1998 Wise .......................... 382/246

OTHER PUBLICATIONS

Rudberg et al., "High Speed Pipelined Parallel Heffman Decoding", Proceedings of the 1997 IEEE International Symposium on Circuits and Systems, Jun. 9, 1997 to Jun. 12, 1997, vol. 3, pp. 2080–2083.*
Hauck et al., "Asynchronous VLSI Architectures for Huffman CODECs", Proceedings of the 1998 IEEE International Symposium on Circuits and Systems, May 31, 1998–Jun. 3, 1998, vol. 5, pp. 542–545.*
Lee et al., A Memory–Based Architecture for Very–High–Throughput Variable Length CODEC design, Proceedings of the 1997 IEEE International Symposium on Circuits and System, Jun. 9, 1997–Jun. 12, 1997, vol. 3, pp. 2096–2099.*
Komori et al., "An Elastic Pipeline Mechanism by Self––Timed Circuits", IEEE Journal of Solid State Circuits, May 22, 1987–May 23, 1987, vol. 23, iss. 1, pp. 111–117.*

* cited by examiner

Primary Examiner—William M. Treat
(74) Attorney, Agent, or Firm—Baker Botts L.L.P.

(57) ABSTRACT

There is disclosed a decoder circuit (20) for decoding input data coded using a variable length coding technique, such as Huffman coding. The decoder circuit (20) comprises an input buffer (100), a logic circuit (150) coupled to the input buffer (100), and an output buffer (700) coupled to the logic circuit (750). The logic circuit (750) includes a plurality of computational logic stages for decoding the input data, the plurality of computational logic stages arranged in one or more computational threads. At least one of the computational threads is arranged as a self-timed ring, wherein each computational logic stage in the ring produces a completion signal indicating either completion or non-completion of the computational logic of the associated computational logic stage. Each completion signal is coupled to a previous computational logic stage in the ring. The previous computational logic stage performs control operations when the completion signal indicates completion and performs evaluation of its inputs when the completion signal indicates non-completion.

14 Claims, 24 Drawing Sheets

VARIABLE-LENGTH, HIGH-SPEED ASYNCHRONOUS DECODER CIRCUIT

CROSS-REFERENCE TO RELATED APPLICATIONS

This application claims the priority of the U.S. provisional application 60/100,406 of Steven M. Nowick, Andrew Wolfe, and Martin Beneš, entitled "A HIGH-SPEED ASYNCHRONOUS DECOMPRESSION CIRCUIT FOR VARIABLE-LENGTH-CODED DATA," filed on Sep. 15, 1998, which is incorporated by reference herein in its entirety.

NOTICE OF GOVERNMENT RIGHTS

The U.S. Government has certain rights in this invention pursuant to the terms of National Science Foundation Award MIP-9408462 and National Science Foundation Award MIP-9501880.

BACKGROUND OF THE INVENTION

1. Field of the Invention

This invention relates to an asynchronous decoder circuit. More specifically, this invention relates to an asynchronous decoder circuit that operates on data coded using a variable-length coding technique, such as Huffman coding.

2. Discussion of the State of the Art

Huffman coding is a lossless coding technique that replaces fixed-length symbols with variable-length codes. Huffman codes are entropy-based, meaning that short codes are assigned to frequently occurring symbols and longer codes are assigned to less frequently occurring symbols. In addition, Huffman codes are prefix codes, meaning that each code has the property that appending additional bits to the end of the code never produces another valid code. Advantageously, Huffman coding has been used for the compression of data.

In most applications utilizing Huffman-coded data, the speed and size of a Huffman decoder are important. For example, Huffman decoders may be used in compressed-code embedded systems. A compressed-code embedded system is a microprocessor or microcontroller-based system in which instructions are stored in compressed form in memory, then are decompressed when brought into a cache. As a result, a significant reduction in instruction memory size may be obtained. The design of a decompression circuit for these systems is highly constrained. In particular, the circuit must be very fast (since it is on the critical path between the processor and memory) and must also be very small (otherwise the savings in instruction memory will be lost to the area increase due to the decompression circuit).

As another example, Huffman decoders are also used in decompressing audio and video under the MPEG-2 image coding standard from the Moving Picture Experts Group (a working group of ISO). Under MPEG-2, a Huffman decoder is required to decode data at a rate of 100 Mbits/sec or greater to maintain a sufficient quality of audio and video.

Thus far, there have been two commonly-used approaches to the design of Huffman decoders, both of which are synchronous (that is, the decoders are synchronized to an external system clock). In the first approach, known as the constant-input-rate approach, the input data stream is processed at a rate of one bit per clock cycle by traversing a Huffman code tree through the use of a finite state machine. To achieve a high performance using this type of design requires a very fast clock, introducing many very difficult high-speed circuit problems. In fact, it is unlikely that a state machine of adequate complexity can be designed to run at the speeds required by the constant-input-rate approach on a silicon wafer produced by some semiconductor processes, such as a 0.8 $\mu$ CMOS process. To avoid the problems caused by the use of very high-speed clocks, multiple state transitions may be combined into a single cycle. As multiple state transitions are combined, however, the complexity and circuit area of the decoder increase approximately exponentially with respect to the increased performance per clock cycle.

A second commonly-used approach to the design of Huffman decoders is a constant-output-rate approach. In this approach, a portion of the input data stream, at least as long as the longest input symbol, is translated into an output symbol on each clock cycle. One disadvantage to this approach is that it requires a complex shifting network to remove variable length symbols from the input data stream, as well as more complex symbol detection circuitry than the constant-input-rate approach. This complexity has a negative impact on the circuit area of the design.

Another disadvantage of the constant-output-rate approach is that the length of the critical path is dominated by the time to detect and decode the longest input symbol. Thus, the vast majority of cycles are limited by a very infrequent worst-case path. Furthermore, the input data buffer and shifting network must be wide enough to store and shift the longest of the input symbols, which is inefficient since the most frequently occurring input symbols will be shorter than the longest input symbol.

In sum, each of the two commonly-used approaches to the design of Huffman decoders requires compromises and trade-offs between high-speed and low-area implementations. Accordingly, there exists a need for an improved Huffman decoder design that provides a higher ratio of performance to circuit area than is possible with existing circuit designs.

SUMMARY OF THE INVENTION

The present invention solves the foregoing problems by employing an innovative asynchronous design, which produces a decoder that is significantly smaller than comparable synchronous decoders, and yet has a higher throughput rate than these decoders after normalizing for voltage and process.

According to the present invention there is provided a decoder circuit including an input buffer for receiving input data coded using a variable-length coding technique; a logic circuit coupled to the output of the input buffer including a plurality of computational logic stages for decoding the input data, the plurality of computational logic stages arranged in one or more computational threads, at least one of the computational threads being arranged as a self-timed ring wherein each computational logic stage in the ring produces a completion signal indicating either completion or non-completion of the computation logic stage, the completion signal of each computational logic stage being coupled to a previous computational logic stage in the ring, the previous computational logic stage performing control operations when the completion signal indicates completion and performing evaluation of its inputs when the completion signal indicates non-completion; and an output buffer coupled to the output of the logic circuit.

According to another aspect of the present invention, there is provided a decoder circuit including: an input buffer for receiving input data including coded, variable-length data words; an alignment circuit coupled to the output of the input buffer for shifting the input data by an amount responsive to a control input; a first logic circuit coupled to the output of the alignment circuit for decoding the coded, variable-length data words; a second logic circuit coupled to the output of the alignment circuit for determining the length of the coded, variable-length data words; a register; an adder circuit coupled to the output of the register and the output of the second logic circuit, the output of the adder circuit coupled to the input of the register and to the control input of the alignment circuit; and an output buffer coupled to the output of the first logic circuit; wherein the alignment circuit, second logic circuit, and the adder circuit are logically partitioned into a plurality of computational stages arranged in a computation thread, each of the computational stages having associated therewith a completion circuit for producing a completion signal indicating the completion or non-completion of each computational stage, each the completion signal being coupled to a previous computational stage, each the previous computational stage performing control operations when the completion signal indicates completion and performing evaluation of its inputs when the completion signal indicates non-completion.

Preferably, each of the computational stages is implemented in dynamic logic and the control operations include precharging.

Preferably, the alignment circuit is a barrel shifter.

Preferably, the input buffer comprises a plurality of registers connected in series, the adder circuit produces a carry output, and the first logic circuit produces a completion signal after each of the coded, variable-length data words are decoded. Preferably, the decoder circuit further includes a shift circuit coupled to the carry output of the adder circuit and the completion signal of the first logic circuit, the shift circuit producing a control signal output for clocking the plurality of registers of the input buffer.

Preferably, the shift circuit produces a completion signal that is coupled to the alignment circuit.

Preferably, the shift circuit comprises a pre-shift circuit and a final-shift circuit, the pre-shift circuit being coupled to one or more significant bits of the output of the second logic circuit and the final-shift circuit being coupled to the carry output of the adder.

Preferably, each of the coded, variable-length data words are associated with a class, all of the members of the class having the same word length and a plurality of common bits, the plurality of common bits being unique to each class, and wherein the second logic circuit comprises a match class circuit for determining the class associated with each of the coded, variable-length data words.

Preferably, the first logic circuit is coupled to the output of the match class circuit.

Preferably, the match class circuit comprises a plurality of decoders arranged in a tree structure.

Preferably, the adder circuit is a look-ahead carry adder including a PKG circuit, a carry circuit coupled to the PKG circuit, and a sum circuit coupled to the carry circuit.

Preferably, each completion circuit is a matched delay for its associated computational stage.

According to yet another aspect of the present invention, there is provided a compressed code microprocessor system including: a microprocessor; a memory having stored therein program instructions compressed using a variable-length coding technique, the program instructions being executable in the microprocessor; and a decompression circuit coupled in asynchronous communication with the microprocessor and the memory, the decompression circuit including an input buffer for receiving compressed program instructions from the memory; a logic circuit coupled to the output of the input buffer including a plurality of computational logic stages for decompressing the compressed program instructions; the plurality of computational logic stages arranged in one or more computational threads, at least one of the computational threads being arranged as a zero-overhead self-timed ring wherein each computational logic stage in the ring produces a completion signal indicating either completion or non-completion of the computation logic stage, the completion signal being coupled to a previous computational logic stage in the ring, the previous computational logic stage performing control operations when the completion signal indicates completion and performing evaluation of its inputs when the completion signal indicates non-completion; and an output buffer coupled to the output of the logic circuit for transmitting decompressed program instructions.

Preferably, the compressed code microprocessor system further includes a cache coupled to the microprocessor and the decompression circuit.

BRIEF DESCRIPTION OF THE DRAWINGS

Exemplary embodiments of the present invention will now be described in detail with reference in the accompanying drawings in which:

FIG. 2b is an exemplary timing diagram for an asynchronous, four-phase protocol that may be used with the decoder of FIG. 2a;

DETAILED DESCRIPTION

The present invention will be described in regard to a compressed-code embedded system. An embedded system is a system that incorporates microprocessors, or microcontrollers, yet is not itself a general-purpose computer. Embedded systems are now extremely widespread and are included in, for example, controllers for automobiles, airplanes, and portable consumer electronics. These systems typically include a microprocessor or microcontroller, which executes a stored program determined by the system designer. The instruction memory is either integrated on the same chip as the microprocessor or microcontroller, or is external.

Practical embedded systems are often limited by constraints on size, weight, power consumption and price. In particular, for low-cost and high-volume systems (such as portable consumer electronics systems), the cost of the system is often closely tied to the total area of the circuitry contained in the system. In such systems, a significant percentage of the area may be devoted to the instruction ROM of an embedded system, which stores the program code. Therefore, techniques to reduce the size of the instruction ROM are of critical importance.

Recently, Wolfe et al. introduced a useful approach to designing compact embedded systems, called a compressed-code architecture. (See M. Kozuch and A. Wolfe, *Compression of Embedded System Programs*, IEEE International Conference on Computer Design, pp. 270–277, October 1994; and A. Wolfe and A. Chanin, *Executing Compressed Programs on an Embedded RISC Processor*, 25th Annual International Symposium on Microarchitecture, pp. 81–91, December 1992. See also Martin Beneš et al., *A Fast Asynchronous Huffman Decoder for Compressed-Code Embedded Processors*, 4th IEEE International Symposium on Advanced Research in Asynchronous Circuit Systems, San Diego, Calif., March–April, 1998, which is incorporated by reference herein in its entirety.)

In this approach, embedded programs are stored in memory in compressed format, then are decompressed in an instruction cache, and executed in standard format. This solution results in reduced memory size, with only a minimal impact on processor performance.

In particular, Wolfe et al. proposed that a program be compressed at development time, and stored in instruction memory. Compression is performed on small fixed-size program blocks, such as one-byte blocks. At runtime, when the processor attempts to access portions of memory not present in the cache, a cache refill engine locates the appropriate compressed instructions or data in memory, decompresses them, and writes them into the cache. It should be noted that decompression is required only on a cache miss; at all other times, the processor simply executes normal uncompressed instructions that are already present in the cache.

Figure 1:
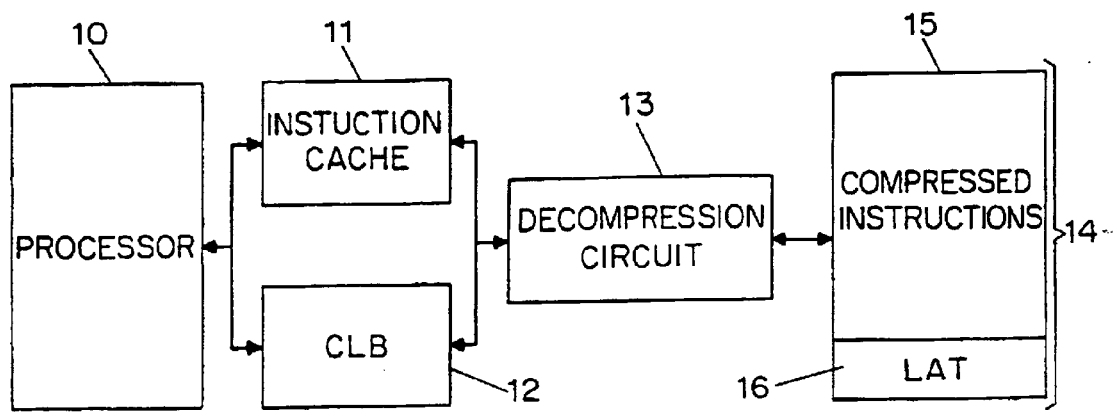
FIG. 1 is a block diagram of a compressed-code microprocessor system according to a preferred embodiment of the present invention.

A simple block diagram of a compressed-code architecture is shown in FIG. 1. The compressed-code system includes a processor 10 coupled to an instruction cache 11 and a cache look-aside buffer (CLB) 12. The instruction cache 11 and the CLB 12 are coupled to a decompression circuit 13, which in turn is coupled to an instruction memory 14. The instruction memory 14 is divided into two portions, a compressed instruction memory portion 15 and a line address table (LAT) 16.

The LAT 16 serves as a page table for the compressed instruction lines located in the compressed instruction memory portion 15. The CLB 12 serves to cache the most recently accessed LAT entries to speed up cache line refill. Wolfe et al. have reported that the overheads of LAT and CLB are very small.

A compression-code architecture allows a substantial reduction in the size of instruction memory. Using a Huffman-encoding technique for instructions, Wolfe et al. has reported that a compression ratio (i.e., a ratio of compressed program size to uncompressed program size) of 76% can be obtained for typical applications for the MIPS processor. This ratio includes the small overheads required to detect and align variable-length compressed cache lines in instruction memory. The reduction in program size can translate into lower cost, weight and power consumption for the entire embedded system. It can also allow the addition of extra program features without increasing the budget for memory size. Finally, compression can result in lower system power, since fewer bus cycles are required to fetch compressed instructions.

Figure 2A:
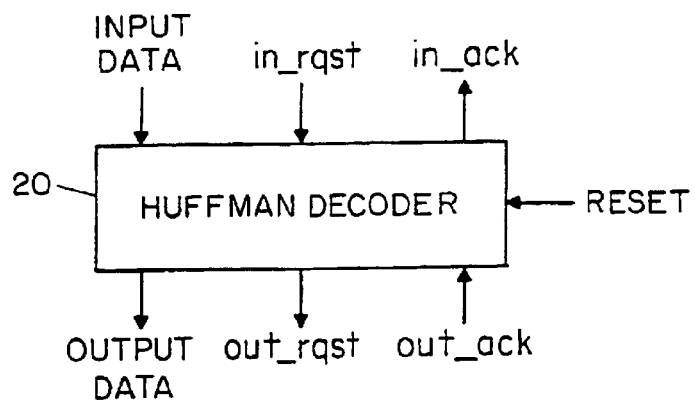
FIG. 2a is a block diagram of a decoder according to a preferred embodiment of the present invention.

FIG. 2a shows a simple, high-level diagram of a Huffman decoder 20, according to a preferred embodiment of the present invention, which may be used as the decompression circuit 13 of FIG. 1. The Huffman decoder 20 receives input data from memory and, after decompressing the input data, transmits output data to the instruction cache. The Huffman decoder 20 has a reset input controlled by the cache, which resets the decoder when the cache is full. The reset input is released when a cache miss occurs, requiring the cache to be refilled.

Figure 2B:
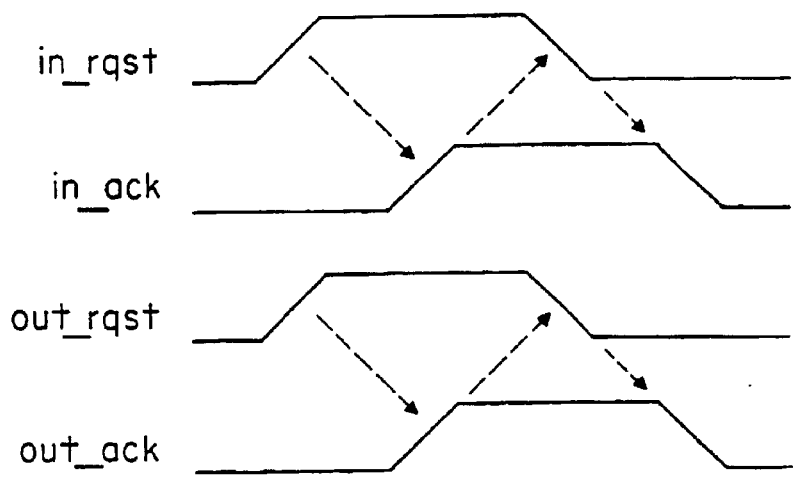

Unlike prior synchronous designs, communication between the Huffman decoder 20 of the present invention and external circuits (e.g., memory and cache) does not involve a clock signal. Instead, external communication is controlled using an asynchronous handshaking protocol. As shown in FIGS. 2a and 2b, the protocol preferably is a simple, four-phase protocol. On the input side, the protocol utilizes an input request signal in_rqst and an input acknowledge signal in_ack. On the output side, the protocol utilizes an output request signal out_rqst and an output acknowledge signal out_ack.

FIG. 2b shows exemplary timing diagrams for the asynchronous, four-phase protocol of the input and output control signals of the Huffman decoder 20. As shown in FIG. 2b, a request is made by asserting the appropriate request signal (either in_rqst or out_rqst) high. Once a request has been made, the corresponding acknowledge signal (either in_ack in response to in_rqst or out_ack in response to out_rqst) is asserted high, to acknowledge the request. In response to an acknowledge signal (either in_ack or out_ack) being set high, the corresponding request signal (either in_rqst or out_rqst, respectively) is set low. Then, in response to a request signal (either in_rqst or out_rqst) being set low, the corresponding acknowledge signal (either in_ack or out_ack, respectively) is set low.

Advantageously, the Huffman decoder 20 of the present invention has both a variable-rate input and a variable-rate output. The asynchronous design can be optimized for common, rather than rare codes and improved average-case performance may thus be obtained. In contrast, performance of a synchronous design may be limited due to worst-case fixed clock rate, or the area of a synchronous design may be limited due to the overhead needed to handle worst-case computation efficiently.

It should be noted that since the instruction cache 11 of the compressed-code system of FIG. 1 holds only a small fraction of the program at one time, it is not possible to decompress the entire program at one time; therefore, a block-oriented compression scheme is required. Preferably, the compression scheme uses Huffman codes based on the aggregate distribution of 8-bit input symbols determined through the analysis of a large set of typical programs for a given processor architecture. Although the Huffman codes thus obtained are not optimal for any given program, their performance is close to optimal.

Furthermore, they can be hardwired into the decompression hardware, instead of being stored in memory along with each program. It should also be noted that although a larger block size, such as 16 bits, would provide better compression, 8-bit symbols perform nearly as well and can be decoded with far less hardware. Table 1 shows an example of Huffman coding for the MIPS processor instruction set. The codes used are based on measurements of byte frequencies from programs for the MIPS architecture. As shown in Table 1, the Huffman codes range in length from two bits to fourteen bits for each symbol byte.

TABLE 1

Example of Huffman Coding for MIPS Architecture

| | | | | | | | | | | |
|---|---|---|---|---|---|---|---|---|---|---|
| 00 | 00 | 2c | 10111001 | 86 | 110111000 | b6 | 1110111110 | fd | 11111001010 | fg | 111111100000 |
| 8f | 01000 | b0 | 10111010 | 43 | 110111001 | fe | 1110111111 | 7c | 11111001011 | f5 | 111111100001 |
| 24 | 01001 | 09 | 10111011 | b9 | 110111010 | e2 | 1111000000 | 65 | 11111001100 | 56 | 111111100010 |
| 01 | 01010 | f8 | 10111100 | 8a | 110111011 | e6 | 1111000001 | 67 | 11111001101 | d2 | 111111100011 |
| 10 | 01011 | e7 | 10111101 | 6c | 110111100 | ef | 1111000010 | f7 | 11111001110 | cd | 111111100100 |
| 46 | 011000 | a8 | 10111110 | 32 | 110111101 | dc | 1111000011 | 71 | 11111001111 | f6 | 111111100101 |
| 25 | 011001 | ae | 10111111 | a9 | 110111110 | ce | 1111000100 | 3a | 11111010000 | ed | 111111100110 |
| 80 | 011010 | gg | 11000000 | 0b | 110111111 | 7f | 1111000101 | 9c | 11111010001 | 5c | 111111100111 |
| 08 | 011011 | 90 | 11000001 | 4c | 111000000 | 4b | 1111000110 | 7b | 11111010010 | 77 | 111111101000 |
| 03 | 011100 | e4 | 11000010 | aa | 111000001 | 4e | 1111000111 | 6b | 11111010011 | f2 | 111111101001 |
| 21 | 011101 | 50 | 11000011 | 13 | 111000010 | 39 | 1111001000 | 6a | 11111010100 | 97 | 111111101010 |
| 0c | 011110 | 2a | 11000100 | 64 | 111000011 | 2f | 1111001001 | c3 | 11111010101 | c9 | 111111101011 |
| 04 | 011111 | 44 | 11000101 | 0d | 111000100 | dc | 1111001010 | 1b | 11111010110 | 7d | 111111101100 |
| 29 | 100000 | bd | 11000110 | 68 | 111000101 | 45 | 1111001011 | 66 | 11111010111 | 55 | 111111101101 |
| ff | 100001 | 06 | 11000111 | 22 | 111000110 | 51 | 1111001100 | 35 | 11111011000 | ea | 111111101110 |
| 02 | 100010 | a5 | 11001000 | 2b | 111000111 | b3 | 1111001101 | 4d | 11111011001 | e9 | 111111101111 |
| af | 100011 | bf | 11001001 | a7 | 111001000 | 62 | 1111001110 | 79 | 11111011010 | 95 | 111111110000 |
| c0 | 1001000 | 1c | 11001010 | a3 | 111001001 | 9c | 1111001111 | 1c | 11111011011 | 9b | 111111110001 |
| 8c | 1001001 | 8d | 11001011 | 89 | 111001010 | cf | 1111010000 | 3e | 11111011100 | 9f | 111111110010 |
| 8c | 1001010 | 38 | 11001100 | fc | 111001011 | 4f | 1111010001 | be | 11111011101 | fb | 111111110011 |
| 84 | 1001011 | 11 | 11001101 | ad | 111001100 | f4 | 1111010010 | 47 | 11111011110 | 69 | 111111110100 |
| 82 | 1001100 | 26 | 11001110 | c8 | 111001101 | 52 | 1111010011 | e1 | 11111011111 | 53 | 111111110101 |
| e0 | 1001101 | a4 | 11001111 | 23 | 111001110 | 91 | 1111010100 | 1f | 11111100000 | eb | 111111110110 |
| 28 | 1001110 | ac | 11010000 | 31 | 111001111 | 99 | 1111010101 | b7 | 11111100001 | 96 | 111111110111 |
| c4 | 1001111 | a0 | 11010001 | 87 | 111010000 | 5c | 1111010110 | 49 | 11111100010 | d7 | 111111111000 |
| 30 | 1010000 | 05 | 11010010 | 81 | 111010001 | c5 | 1111010111 | 33 | 11111100011 | da | 1111111110001 |
| 18 | 1010001 | 60 | 11010011 | 15 | 111010010 | 17 | 1111011000 | of | 11111100100 | d3 | 1111111110010 |
| c7 | 1010010 | 2e | 110101000 | 58 | 111010011 | c1 | 1111011001 | 36 | 11111100101 | bb | 1111111110011 |
| 14 | 1010011 | ab | 110101001 | 98 | 111010100 | 7c | 1111011010 | e5 | 11111100110 | d5 | 1111111110100 |
| 40 | 1010100 | 63 | 110101010 | 0a | 111010101 | 61 | 1111011011 | 93 | 11111100111 | 9d | 1111111110101 |
| 27 | 1010101 | 29 | 1101010:1 | 0f | 111010110 | b5 | 1111011100 | f9 | 11111101000 | 5d | 1111111110110 |
| 3e | 1010110 | 92 | 110101100 | 83 | 111010111 | b2 | 1111011101 | 1a | 11111101001 | 9a | 1111111110111 |
| 12 | 10101110 | 8b | 110101101 | a2 | 111011000 | c8 | 1111011110 | ee | 11111101010 | 75 | 1111111111000 |
| 48 | 10101111 | d8 | 110101110 | ab | 111011001 | 74 | 1111011111 | 76 | 111111010110 | 5f | 1111111111001 |
| 42 | 10110000 | b1 | 110101111 | 0e | 1110110:0 | ec | 1111100000 | dc | 111111010:11 | 7a | 1111111111010 |
| 41 | 10110001 | 94 | 110110000 | 73 | 1110110110 | 37 | 1111100010 | 3f | 111111011000 | 57 | 1111111111011 |

TABLE 1-continued

Example of Huffman Coding for MIPS Architecture

| 07 | 10110010 | d0 | 110110001 | 6c | 1110110111 | ea | 11111000011 | 5a | 111111011001 | ba | 1111111111100 |
|----|----------|-----|-----------|-----|------------|-----|-------------|-----|--------------|-----|---------------|
| 85 | 10110011 | c6 | 110110010 | 2d | 1110111000 | d6 | 11111000100 | 5b | 111111011010 | 3b | 1111111111101 |
| 19 | 10110100 | a1 | 110110011 | e2 | 1110111001 | 72 | 11111000101 | f1 | 111111011011 | df | 1111111111110 |
| 78 | 10110101 | 16 | 110110100 | cc | 1110111010 | e3 | 11111000110 | d1 | 111111011100 | dd | 11111111111110 |
| 34 | 10110110 | b4 | 110110101 | 4a | 1110111011 | 1d | 11111000111 | f3 | 111111011101 | db | 11111111111111 |
| b8 | 10110111 | 54 | 110110110 | be | 1110111100 | d9 | 11111001000 | cb | 111111011110 | | |
| 7C | 10111000 | fD | 110110111 | 59 | 1110111101 | 6d | 11111001001 | 3d | 111111011111 | | |

Generally, the decoding of a Huffman-encoded program requires a sequence of interfacing and code translation steps. First, data must be fetched from memory into an input buffer. Typically, the data is fetched from memory in fixed-length words. Next, the input data must be parsed into variable-length tokens. Each token must be translated into the output byte that it represents. The output bytes must then be buffered into output words. Finally, the input data bits corresponding to the output byte must be removed from the input stream and the remaining input data must be realigned in the input buffer. The input buffer must then be refilled as space becomes available, to insure that there is adequate data for the next symbol translation. As many of these steps as possible must be done in parallel to obtain good performance.

Figure 3:
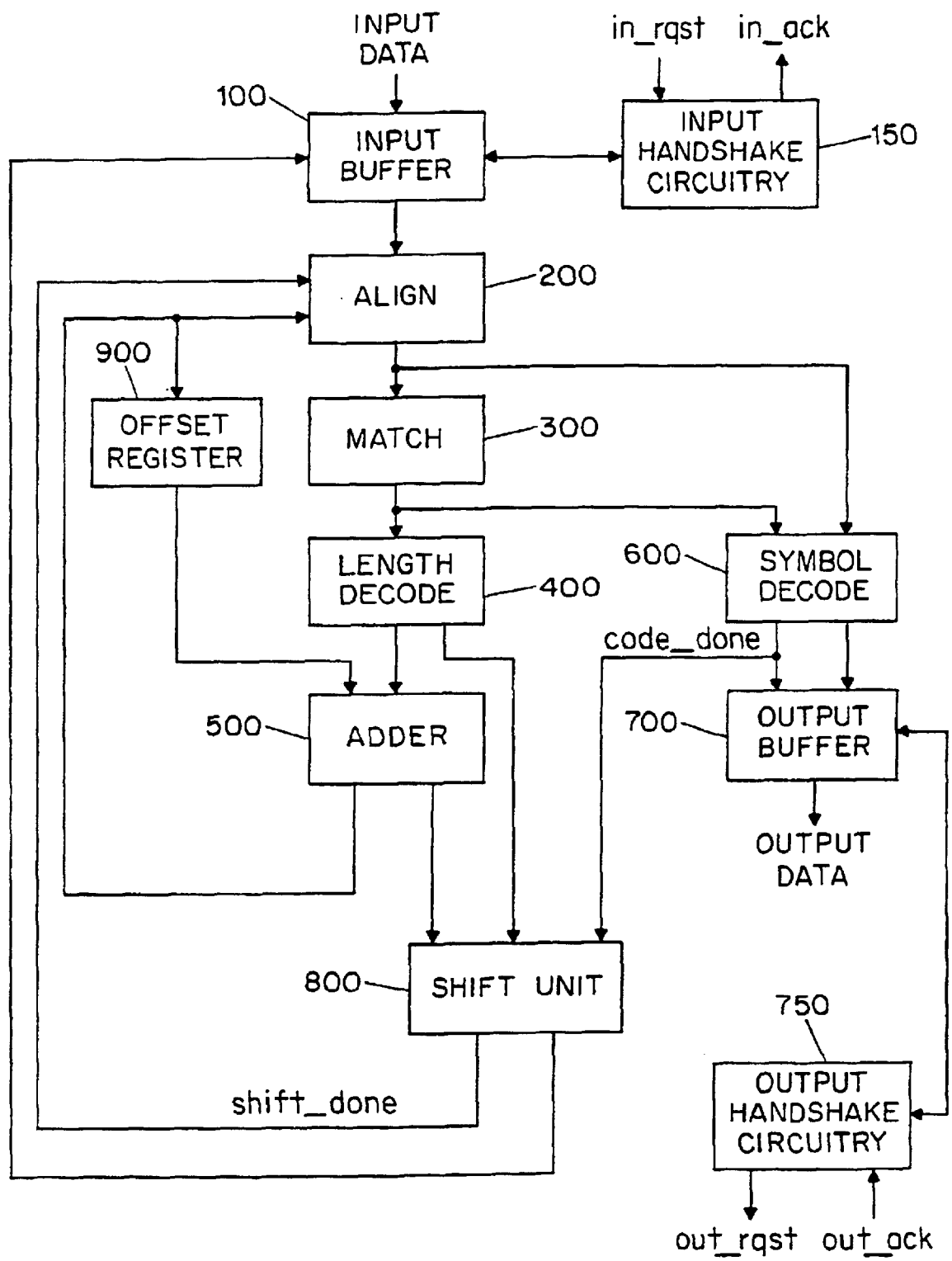
FIG. 3 is a functional block diagram of the architecture of a decoder according to a preferred embodiment of the present invention.

FIG. 3 shows a functional block diagram of the architecture of a Huffman decoder according to a preferred embodiment of the present invention. The Huffman decoder includes an input buffer 100 for storing input data. Data is input into the input buffer 100 in fixed-length words (for example, 32-bit words) under the control of input handshake circuitry 150, which implements an asynchronous handshake as discussed previously. The input buffer 100 includes a plurality of registers connected sequentially for shifting the input data under the control of a shift unit 800.

Once a Huffman code is decoded, it must be removed from the data stream. If the length of the decoded Huffman code is an integral number of bytes, then the decoded Huffman code may be removed by simply shifting an appropriate number of new bytes into the input buffer 100. If the length of the decoded Huffman code is not an integral number of bytes, then residual data bits will be required to be removed from the data stream after any shifting in the input buffer 100 has been performed. The task of removing the remaining residual bits is performed by an align stage 200, which is coupled to the output of the input buffer 100.

The align stage 200 is coupled to a class match stage 300, which receives the aligned data from the align stage 200 and decodes the class associated with the next Huffman code in the aligned data. As will be explained in greater detail below, when Huffman codes are assigned to symbols, the Huffman codes are clustered into a plurality of classes. The members of each class have the same length and a plurality of common starting bits. Advantageously, the assignment of Huffman codes in this manner simplifies the overall decoding process.

The match stage 300 is coupled to a length decode stage 400 and a symbol decode stage 600. Once the class match stage 300 decodes the class of the next Huffman code from the aligned input data, that class is passed to both the length decode stage 400 and the symbol decode stage 600. The length decode stage 400 determines the length of the Huffman code from the class provided by the class match stage 300. At the same time, the symbol decode stage 600 decodes the symbol associated with the Huffman code using the class of the Huffman code from the class match stage 300 and the aligned input data from the align stage 200.

Once the symbol decode stage 600 is finished decoding, it passes the decoded symbol to an output buffer 700, which stores it for transmission to the cache. The symbol decode stage also produces a completion signal, code_done, which it passes to the output buffer 700 and the shift unit 800. The output buffer 700 is coupled to an output handshake circuitry 750, which implements an asynchronous handshake as previously described.

In addition to the align stage 200, an adder 500, offset register 900, and shift unit 800, operate together to remove the currently decoded Huffman code from the data stream so that the next Huffman code is ready to be decoded. The offset register 900 stores the number of residual bits last removed from the data stream for the last decoded Huffman code. This number of residual bits is added to the length of the current Huffman code by the adder 500. The sum of this operation produces a new number of residual bits that must be removed from the input data stream, which is passed to the align stage 200. The new number of residual bits is then also saved in the offset register 900.

The carry output of the adder is coupled to the shift unit 800. If the adder 500 produces a carry condition, the shift unit 800 causes the input buffer 100 to shift the input data. Preferably, one or more of the most significant bits of the output of the length decode stage 400 are routed to the shift unit 800, which act as a form of look-ahead carry inputs that enable the shift unit 800 in appropriate circumstances to begin shifting the input buffer 100 before the adder 500 completes its operation. The shift unit 800 produces a completion signal, shift_done, which is coupled to the align stage 200.

According to a preferred embodiment of the present invention, the decoder architecture of FIG. 3 is organized in the form of a self-timed ring. A self-timed ring is a circuit that does not use a global synchronizing clock and in which the functional stages of the circuit are looped in a ring form. Preferably, the self-timed ring is of a zero-overhead design—that is, the control operations of certain stages are performed in the background while other stages compute. General background on zero-overhead self-timed rings is provided in T. E. Williams, *Self-timed Rings and Their Application to Division*, Technical Report CSL-TR-91-482, Computer Systems Laboratory, Stanford University, 1991 (Ph.D. Thesis); and T. E. Williams and M. A. Horowitz, *A Zero-Overhead Self-timed 54b 160ns CMOS Divider*, IEEE Journal of Solid-State Circuits, Vol. 26(11), pp. 1651–1661, November 1991. These documents are incorporated herein by reference in their entireties. Unlike the simple self-timed rings described by Williams, however, the architecture of FIG. 3 is more complex and includes parallel threads with forks and joins.

Figure 5:
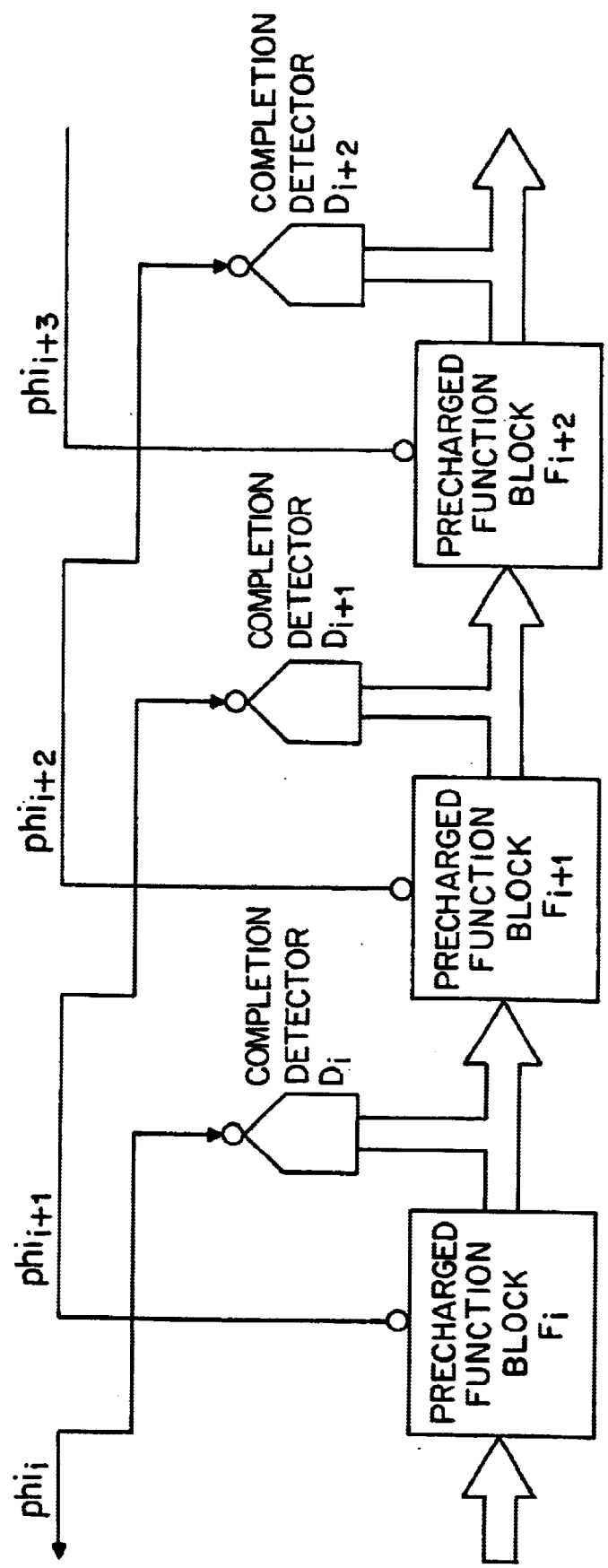
FIG. 5 is a block diagram of a synchronization scheme for a self-timed ring that may be used with a preferred embodiment of the present invention.

FIG. 5 shows a synchronization scheme that may be used to implement a zero-overhead self-timed ring. In FIG. 5, there are three functional blocks $F_i$, $F_{i+1}$, and $F_{i+2}$, which are all precharged dynamic logic blocks. The bubble at the top of each block represents the precharge input for each block and denotes that the block precharges on a low input and computes on a high input.

The input and outputs of the blocks in FIG. 5 represented by the thick arrows are dual rail logic. Dual rail logic is logic that encodes the validity of data within the data itself. Dual rail logic utilizes a pair of wires for every bit transmitted. The wires are both initially low, and either wire going high denotes a new data bit, whose value is determined by the wire that went high. The wires must then return to the initial reset condition in which both wires are low before a new data bit is transmitted. In dual rail logic, both wires going high is an invalid condition. Dual rail logic has the advantage that individual bits of a bus may begin evaluating as soon as their inputs have arrived without having to wait for all of the other bits in the bus. Another advantage is that logic blocks can obtain the opposite polarity of an input signal by simply crossing the wire pair.

Each of the functional blocks of FIG. 5 has a completion detector coupled to its output. The completion detectors $D_i$, $D_{i+1}$, and $D_{i+2}$ produce outputs $phi_i$, $phi_{i+1}$, and $phi_{i+2}$, respectively. The output of the completion detector for each block controls the precharge input of the previous block. Thus, the configuration forces the following synchronization requirements: (i) stage $F_i$ precharges only after stage $F_{i+1}$ has finished its computation; and (ii) stage $F_i$ may evaluate a new data token (its precharge is de-asserted) only after stage $F_{i+1}$ has finished its precharging. An additional requirement—that stage $F_i$ is done precharging before stage $F_{i+1}$ begins precharging—must be insured by delay assumptions.

Figure 6:
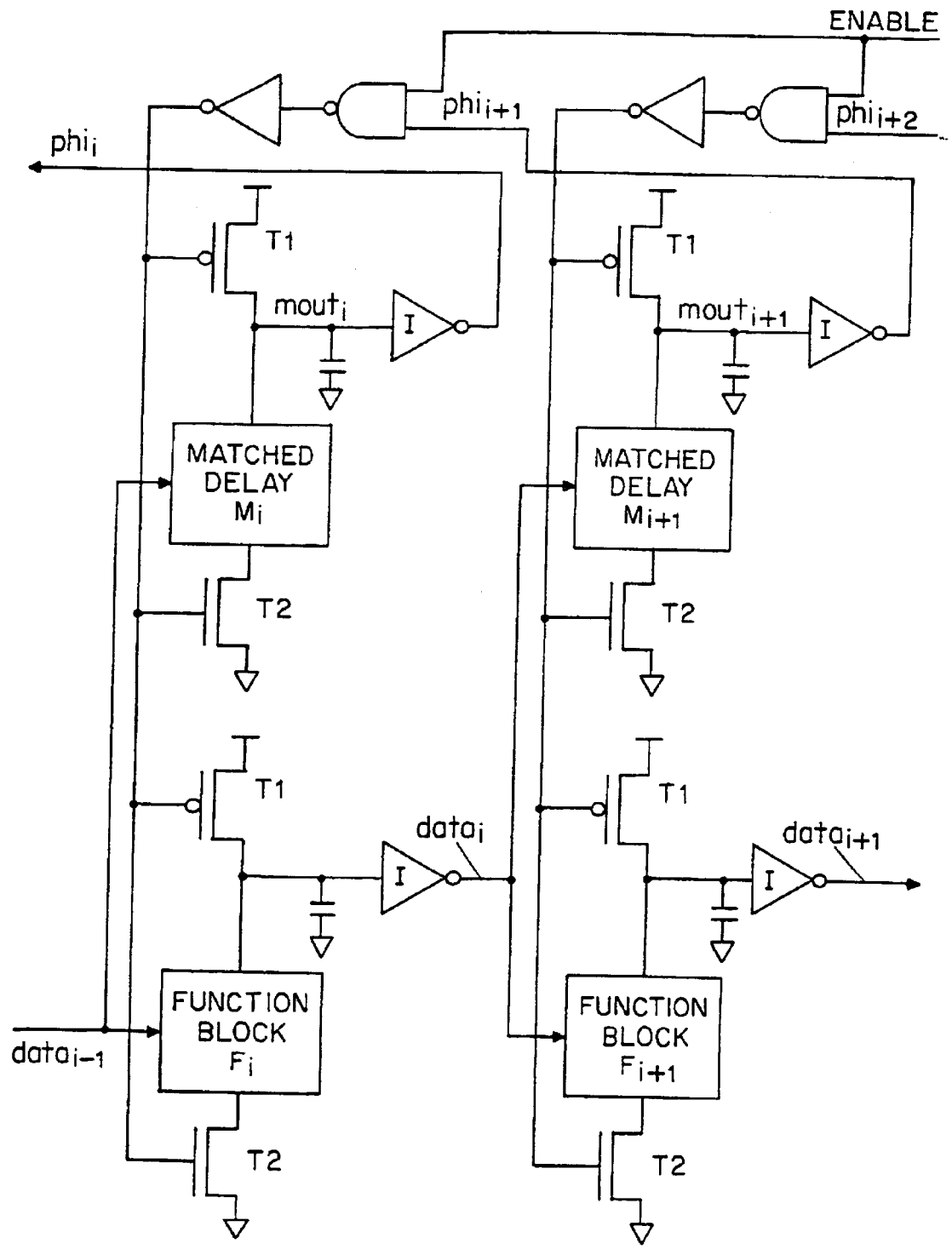
FIG. 6 is a block diagram of another synchronization scheme for a self-timed ring that may be used with a preferred embodiment of the present invention.

A more preferred scheme for implementing a zero-overhead self-timed ring is shown in FIG. 6. The scheme in FIG. 6 uses a matched delay instead of a completion network. For each stage in the ring, a matched delay matches the worst-case path through a function block and indicates to the previous block when the computation of the function block is complete. For example, matched delay $M_i$ in FIG. 6 matches the worst-case path delay of function block $F_i$. Preferably, the matched delay is implemented by a duplicate circuit of the worst-case path; however, any arrangement of dummy gates having the same delay as or a greater delay than the worst-case path may be used.

The matched delays of FIG. 6 are preferably implemented with dynamic logic. Each matched delay has a p-channel MOS pull-up transistor (T1) and an n-channel MOS pull-down transistor (T2). The output of each matched delay contains an inverter (I) coupled to the pull-up transistor (T1). When the precharge input of a matched delay is low, the pull-up transistor charges the m_out output of the matched delay (e.g., m_out$_i$) to a high voltage, which is then inverted by an inverter to produce the phi output of the matched delay (e.g., phi$_i$). When the precharge input of a matched delay stage is high, the matched delay logic evaluates its inputs (e.g., matched delay logic $M_i$ evaluates inputs data$_i$). During evaluation, the pull-down transistor (T2) allows the output m_out to be pulled low.

As shown in FIG. 6, a global enable signal is preferably gated in a logical "AND" with each of the matched delay phi outputs. The global enable signal is an inverted form of the reset signal received by the decoder and resets all of the dynamic functional blocks to the precharge state.

Figure 4:
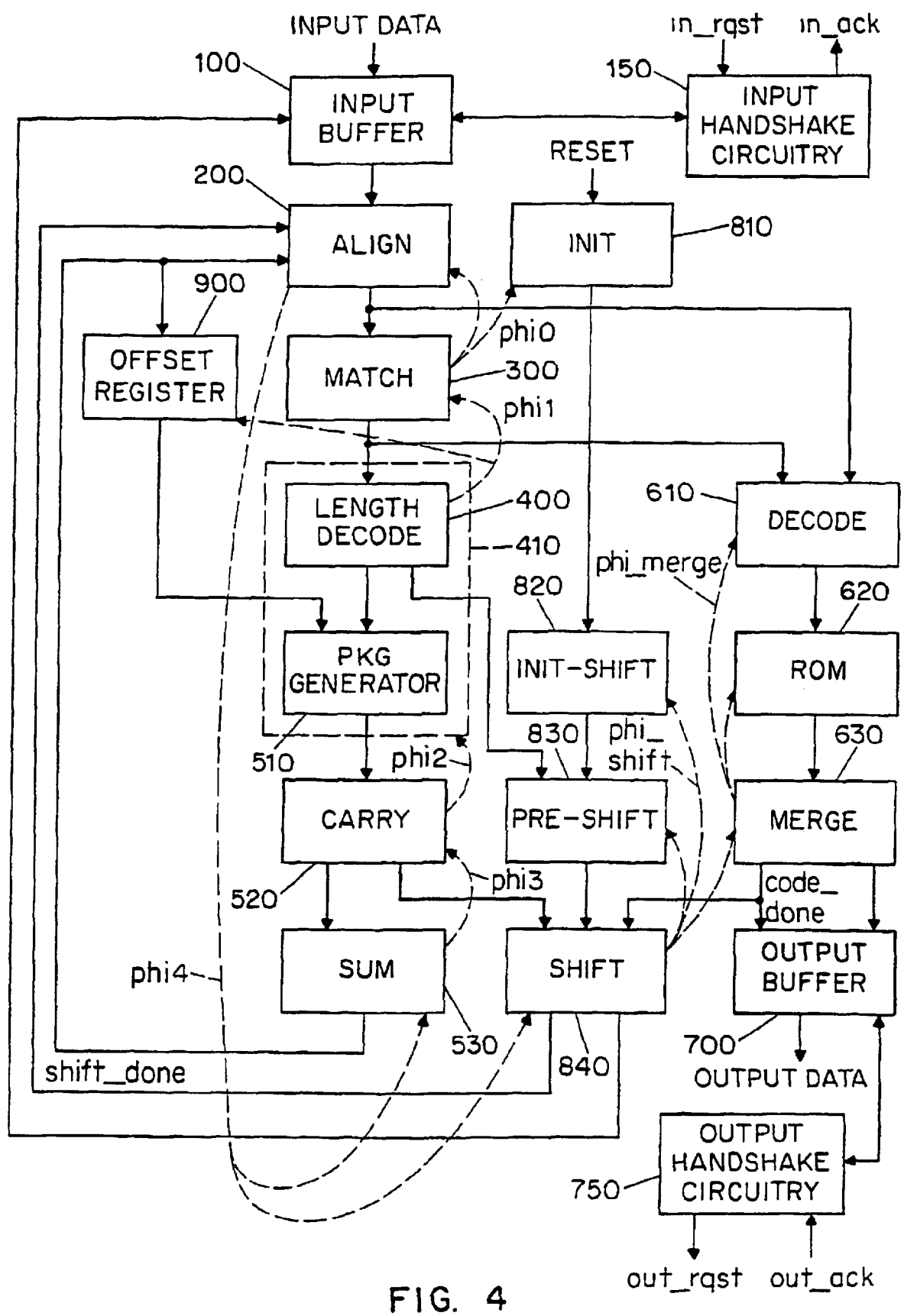
FIG. 4 is a functional block diagram of the architecture of a decoder according to a preferred embodiment of the present invention.

FIG. 4 shows the architecture of the decoder of FIG. 3 with some of the functional blocks of FIG. 3 divided into multiple stages and some functional blocks combined into a single stage. Specifically, the adder 500 of FIG. 3 has been divided into a PKG (propagate/kill/generate) stage 510, a carry stage 520, and a sum stage 530. The shift unit 800 of FIG. 3 has been divided into an initialization stage 810, an initialization-shift stage 820, a pre-shift stage 830, and a final shift stage 840. The symbol decode stage 600 is divided into a decode logic stage 610, a-decode ROM stage 620, and a merge stage 630. As shown by the dotted box in FIG. 4, the length decode stage 400 and the PKG stage 510 are combined into a single length/PKG stage 410.

Preferably, the functional blocks of FIGS. 3 and 4 are implemented using dynamic domino dual-rail logic. Additionally, to maintain the output values of the input buffer 100, output buffer 700, initialization-sift stage 820, the pre-shift stage 830, the final shift stage 840, and the sum stage 530, it is preferred that a staticizer or weak-feedback inverter loop be used at the output of each of these stages. The circuits of FIGS. 3 and 4 may be implemented using a 0.8 micron CMOS process or any other well-known semiconductor process.

The synchronization signals between the blocks in FIG. 4 are indicated by broken arrows and are: phi0 (from the match stage 300 to the align stage 200 and the initialization stage 810); phi1 (from the length/PKG stage 410 to the match stage 300 and the offset register 900); phi2 (from the carry stage 520 to the length/PKG stage 410); phi3 (from the sum stage 530 to the carry stage 520); phi4 (from the align stage 200 to the sum stage 530 and the final shift stage 840); phi_shift (from the final shift stage 840 to the pre-shift stage 830, the initialization-shift stage 820, and the merge stage 630); phi_merge (from the merge stage 630 to the symbol decode ROM stage 620 and the symbol decode logic stage 610). When the synchronization signals are low, the blocks receiving the synchronization signals precharge; when the synchronization signals are high, the blocks receiving them are able to evaluate their inputs and perform computations.

The architecture of FIG. 4 is basically grouped into three parallel computational threads: (i) a thread from the align stage 200 through the sum stage 530; (ii) a thread from the length/PKG stage 410 through the final shift stage 530; and (iii) a thread from the align stage 200 through the merge stage 630. All three threads are synchronized at the align stage 200. More precisely, the third thread (align through merge) must complete before the final shift stage may complete. This is achieved through the use of the code_done signal from the merge stage 630 to the final shift stage 840. The remaining two threads are synchronized at the align stage 200 by the completion signal shift_done and the outputs of the sum stage 530, which are dual-rail outputs.

The preferred architecture of FIG. 4 achieves two main goals. First, the functional blocks are arranged such that the stage delays are reasonably balanced so that control overhead can often be nearly eliminated during computation. Of course, a precise balance is not possible since a few stages (such as the match stage 300) have a highly-variable data-dependent delay. Second, the functional blocks are arranged to achieve as many parallel computational threads as possible (in this case, three) and to schedule computations as early as possible, thus improving total latency.

For the remainder of this specification, the preferred embodiments of the functional blocks of FIG. 4 will be discussed with regard to the Huffman coding of the MIPS architecture shown in Table 1. In addition, it will be assumed that data is received from memory and transmitted to the cache in 32-bit words. It should be understood, however, that the scope of the present invention is not limited to these cases.

Figure 7:
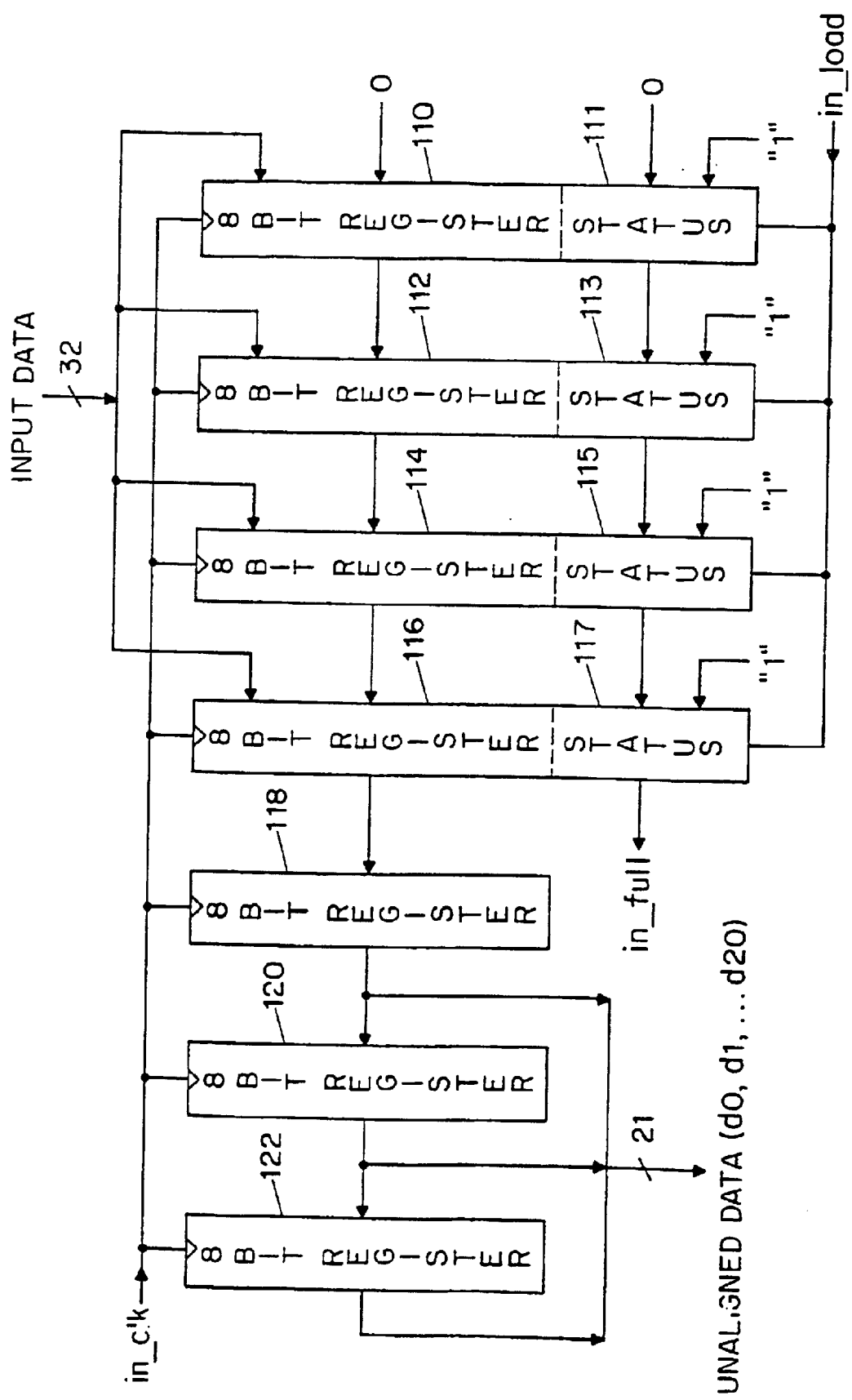
FIG. 7 is a functional block diagram of a preferred embodiment of the input buffer of FIGS. 3 and 4.

FIG. 7 shows a functional block diagram of a preferred embodiment of the input buffer 100. The input buffer is implemented as seven 8-bit registers connected in series. Four of the registers (registers 110, 112, 114, and 116) each receive a byte from the input data word. The registers are controlled by the signals in_clk and in_load. When in_clk is asserted high, the registers clock in the data byte from the preceding register—i.e., the data shifts to the left bytewise. For register 110, a value of zero is clocked in when in_clk is asserted high. When in_load is asserted high, the first four registers (registers 110, 112, 114, and 116) load in parallel a byte of the input data word. Twenty-one bits of the registers 118, 120, and 122 are coupled to the align stage 200. (Twenty-one bits are needed because the longest Huffman code is fourteen bits and the maximum offset of the start of a Huffman code in a register is seven bits.)

The input buffer 100 also includes four one-bit status registers, registers 111, 113, 115, and 117. These registers are controlled by in_clk and in_load in the same way as are registers 110, 112, 114, and 116 with the exception that, when in_load is asserted high, a value of "1" is loaded into each one-bit register. The output of the last one-bit register (register 117) is the in_full signal, which is used to indicate whether registers 110, 112, 114, and 116 hold valid data. When in_full goes low, these registers do not hold any valid data and the input buffer is considered empty.

Of course, to be safely used as status bits, the one-bit registers must be designed so that they reflect the worst-case timing of every bit in the 8-bit registers. Although not shown in FIG. 7, it is preferred that when reset is asserted high, all of the registers are cleared to zero.

Figure 8:
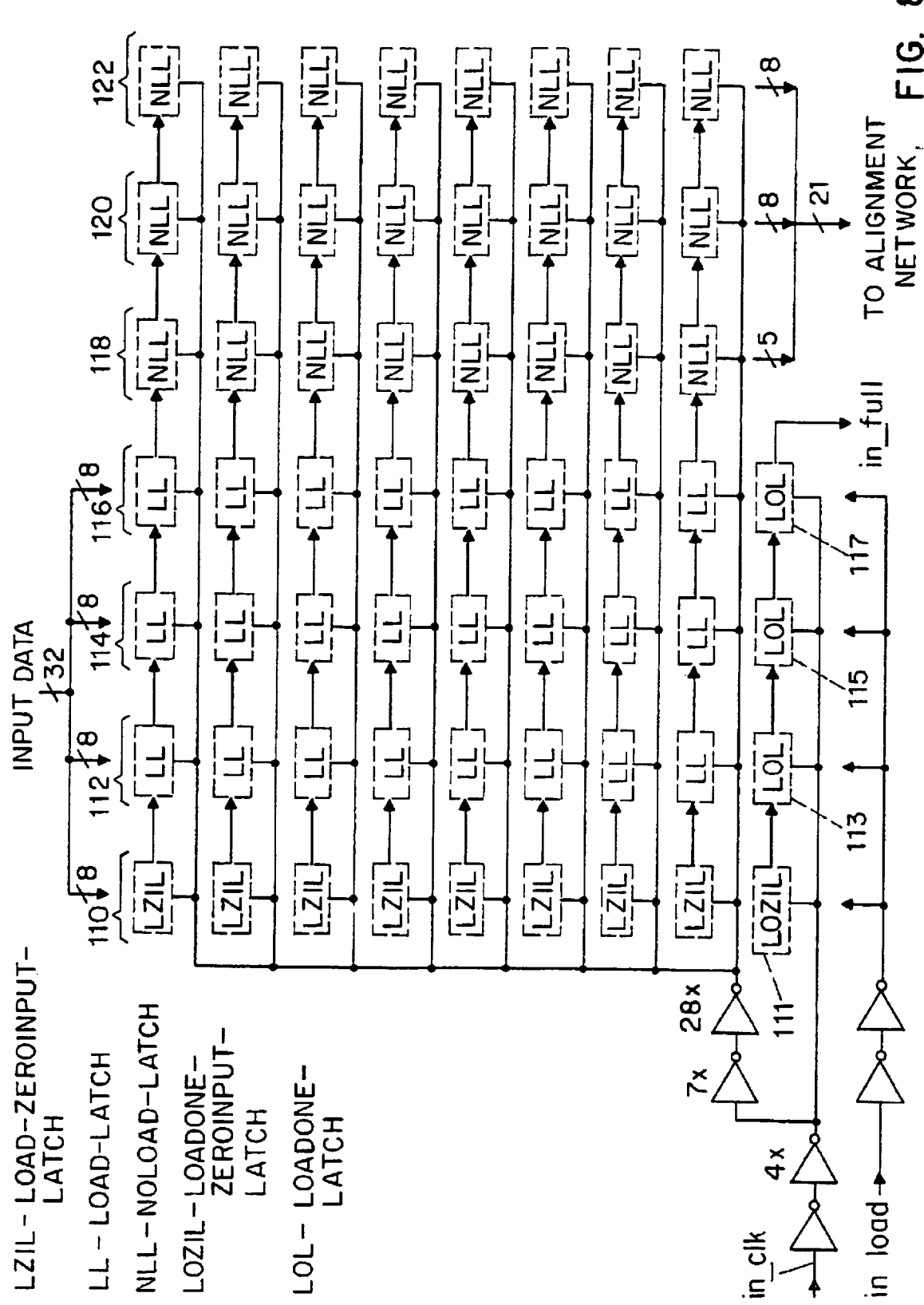
FIG. 8 is a functional block diagram of a preferred embodiment of the registers of FIG. 7.

FIG. 8 shows a functional block diagram of a preferred embodiment of the registers of FIG. 7. The registers of the input buffer are implemented using five types of latches: (1) "load-zero-input latch" (LZIL); (2) "load latch" (LL); (3) "no-load latch" (NLL); (4) "load-one-zero-input latch" (LOZIL); and (5) "load-one latch" (LOL). Each of these latches is a variant of the Svensson latch and will be discussed in greater detail below.

As shown in FIG. 8, register 110 is implemented using eight LZILs; each of registers 112, 114, and 116 are implemented using eight LLs; each of registers 118, 120, and 122 are implemented using eight NLLs; register 111 is implemented using a LOZIL; and registers 113, 115, and 117 are implemented using LOLs.

Because of the high load on the in_clk and in_load signals, these signals must be properly buffered. FIG. 8 shows four levels of inverter buffering for in_clk and two levels of inverter buffering for in_load.

Figure 9:
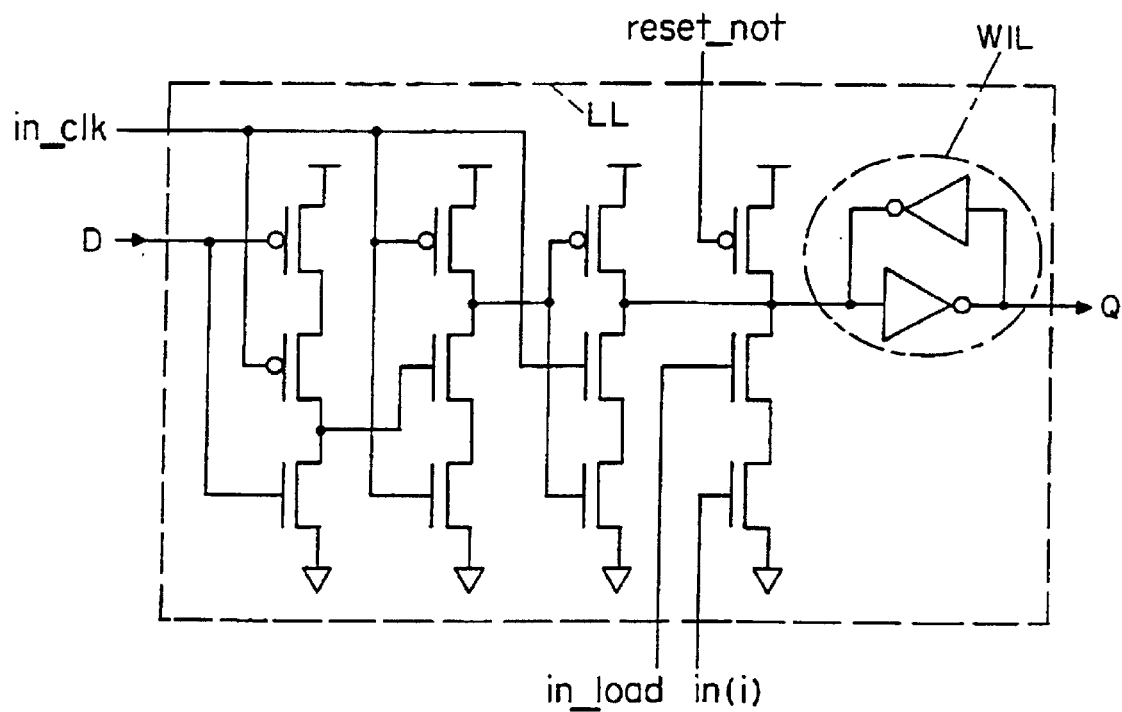
FIG. 9 is a schematic diagram of a preferred embodiment of the LL-type latch of FIG. 8.
Figure 9:
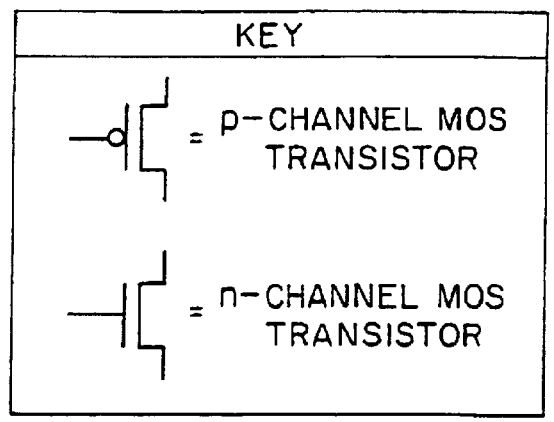

FIG. 9 shows a schematic diagram of a preferred embodiment of the LL-type latch. The latch is implemented using dynamic logic with a weak-feedback inverter loop (WIL) at the output stage. The dynamic logic is implemented using p-channel and n-channel MOS transistors. The key in FIG. 9 provides a reference for the symbols representing p-channel and n-channel MOS transistors. This key is applicable to all of the figures.

In FIG. 9, the output Q takes on the value of the input D when in_clk is asserted high and takes on the value of the input in(i) when in_load is asserted high. The output Q is cleared to zero when reset_not is asserted low.

Figure 10:
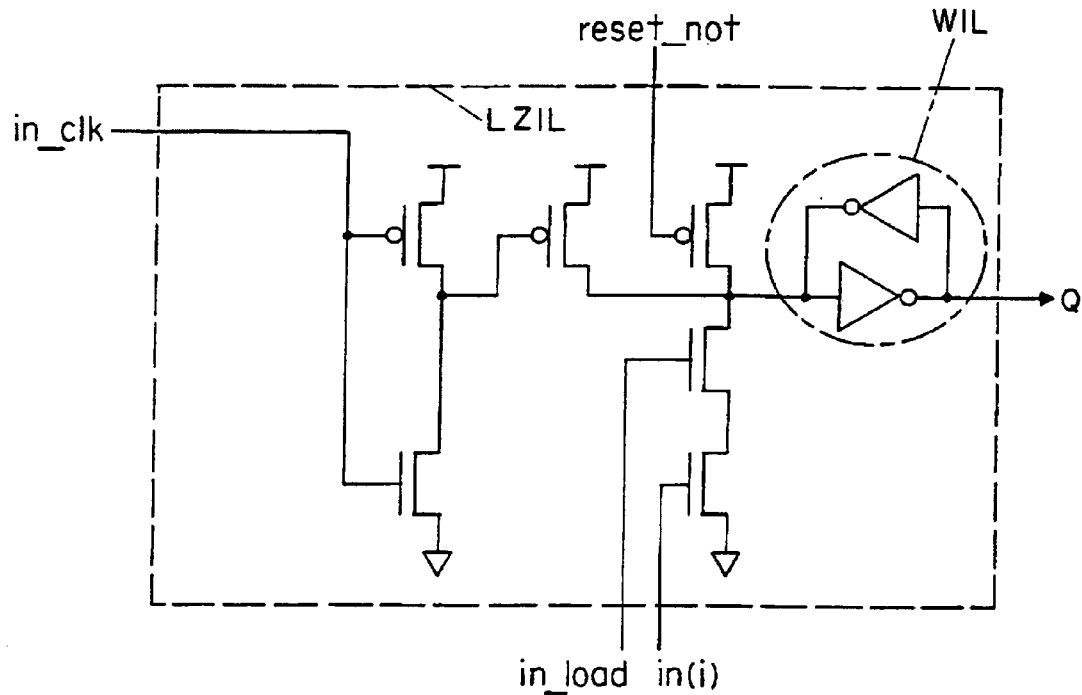
FIG. 10 is a schematic diagram of a preferred embodiment of the LZIL-type latch of FIG. 8.
Figure 11:
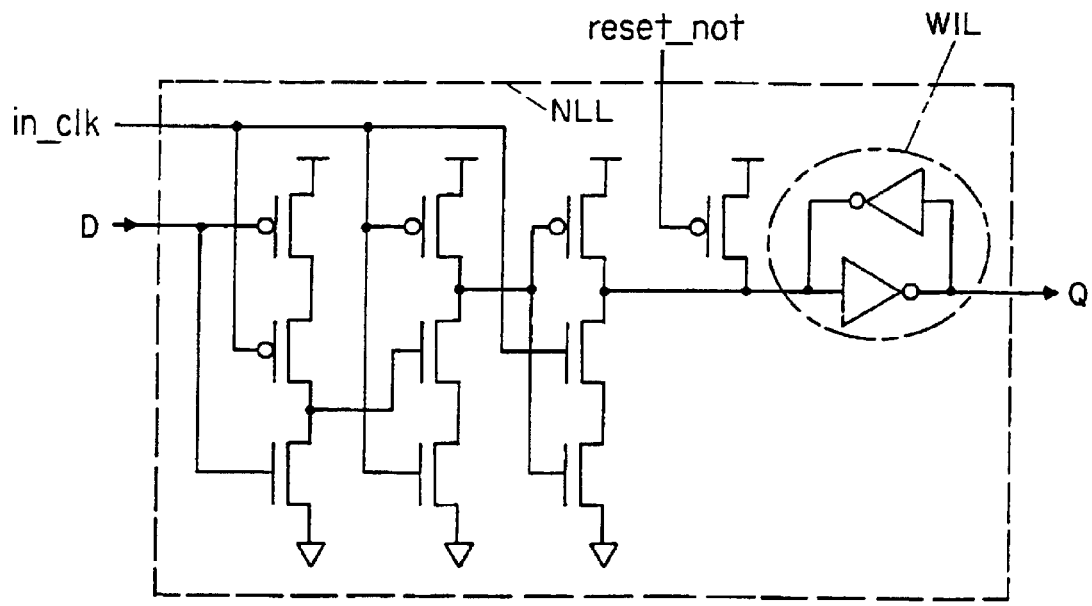
FIG. 11 is a schematic diagram of a preferred embodiment of the NLL-type latch of FIG. 8.

FIGS. 10 and 11 show schematic diagrams of preferred embodiments of the LZIL-type and NLL-type latches, respectively. These latches are simplified versions of the LL-type latch. The LZIL-type latch is similar to the LL-type latch except that it clocks in a zero value when in_clk is asserted high. The NLL-type latch is similar to the LL-type latch except that it does not have a data input that is loaded with the in-load signal.

Figure 12:
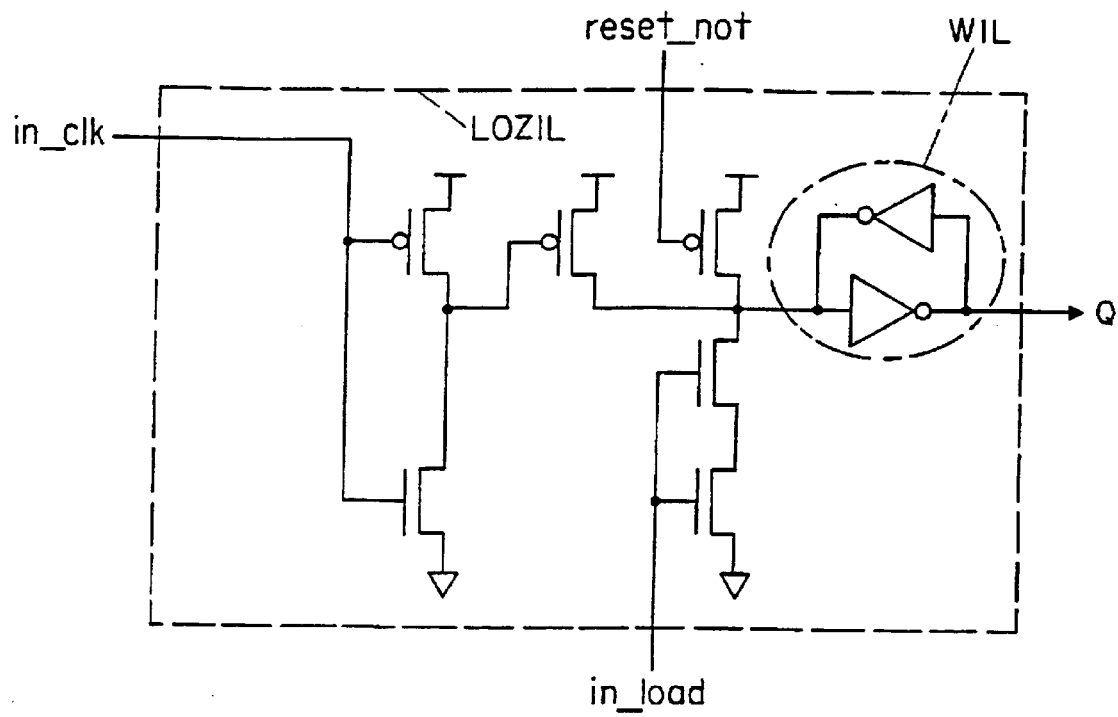
FIG. 12 is a schematic diagram of a preferred embodiment of the LOZIL-type latch of FIG. 8.
Figure 13:
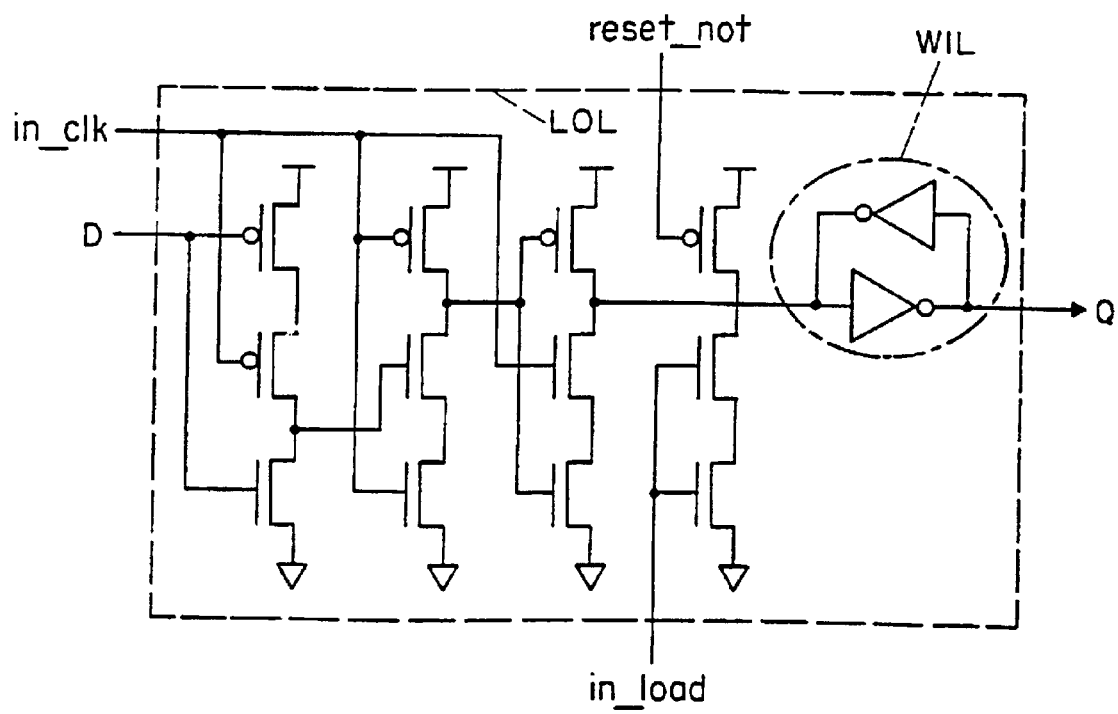
FIG. 13 is a schematic diagram of a preferred embodiment of the LOL-type latch of FIG. 8.

FIGS. 12 and 13 show schematic diagrams of preferred embodiments of the LOZIL-type and LOL-type latches, respectively. The LOZIL-type and LOL-type latches are the same as the LZIL-type and LL-type latches, respectively, except that these latches will always load a value of "1" when in_load is asserted high.

Figure 14:
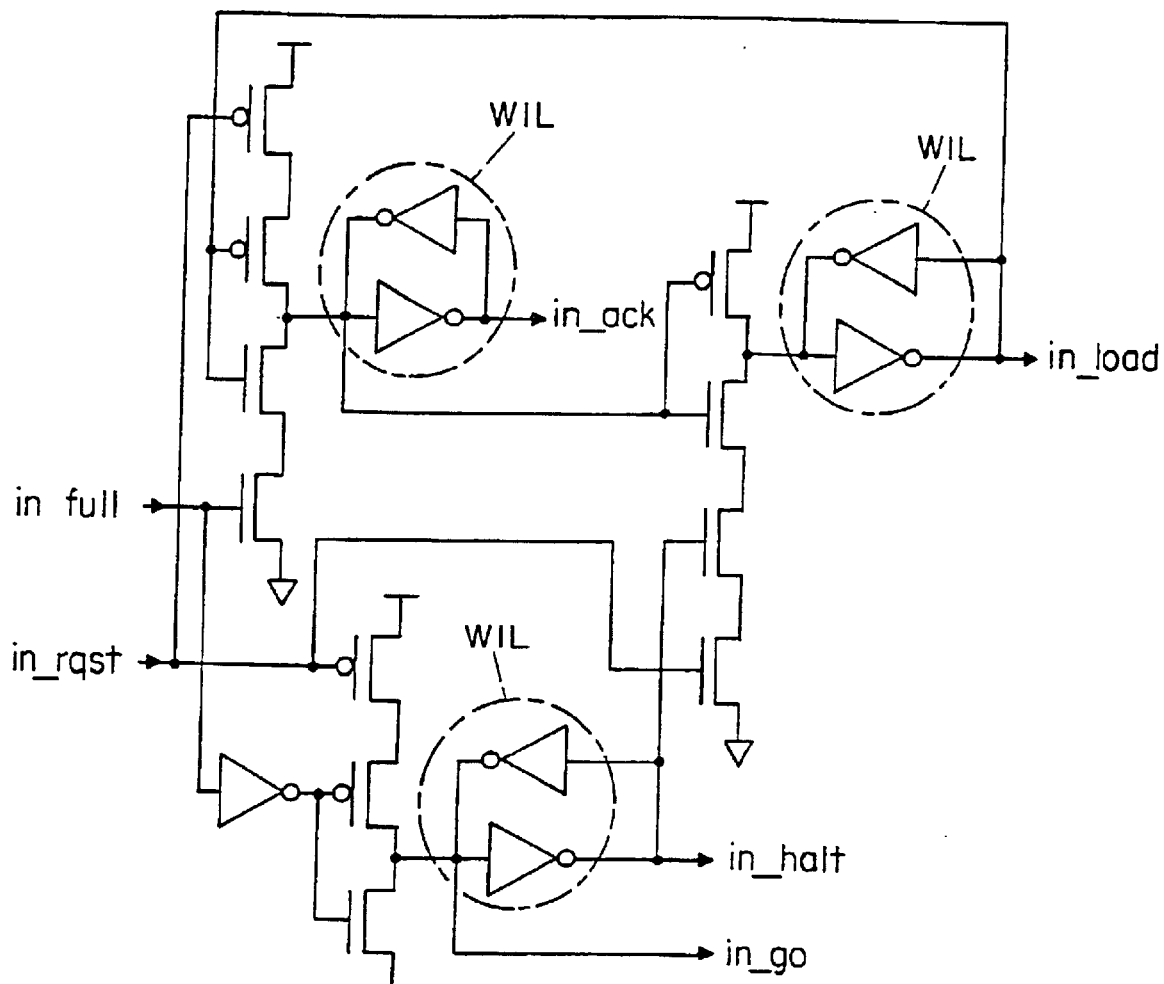
FIG. 14 is a schematic diagram of a preferred embodiment of the input handshaking circuitry of FIGS. 3 and 4.
Figure 15:
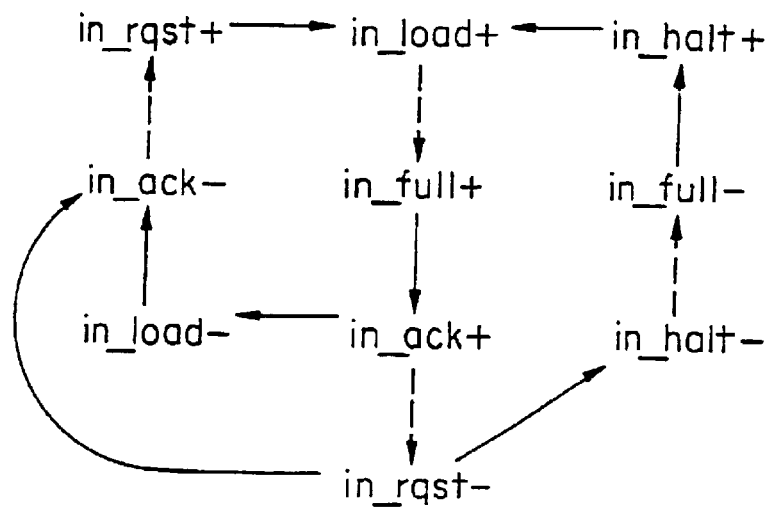
FIG. 15 is an exemplary signal transition diagram for the circuit of FIG. 14.

FIG. 14 shows a schematic diagram of a preferred embodiment of the input handshaking circuitry 150. The circuitry is implemented using dynamic logic using p-channel and n-channel MOS transistors with weak-feedback inverter loops (WILs) at the output stages. FIG. 15 shows a signal transition diagram for the inputs and outputs of FIG. 14. The solid arrows represent transitions of signals generated by the decoder, the dashed arrows represent transitions of signals generated by circuitry external to the decoder. A minus sign ("−") at the end of a signal represents a high-to-low transition, and a plus sign ("+") at the end of a signal represents a low-to-high transition.

The handshake cycle begins when the in_full signal indicates that the input buffer is empty, i.e., when in_full goes low (in_full−). A low transition by in_full (in_full−) causes in_halt to go high (in_halt+). When data becomes available, indicated by a high transition of the signal in_rqst (in_rqst+), the in_load signal is set high (in_load+). When the data is loaded into the input buffers, the status signal in_full goes high (in_full+), causing in_ack to go high (in_ack+). After in_ack goes high (in_ack+), the circuit waits for in_rqst to go low (in_rqst−), which causes in_ack and in_halt to go low (in_ack− and in_halt−).

Figure 16:
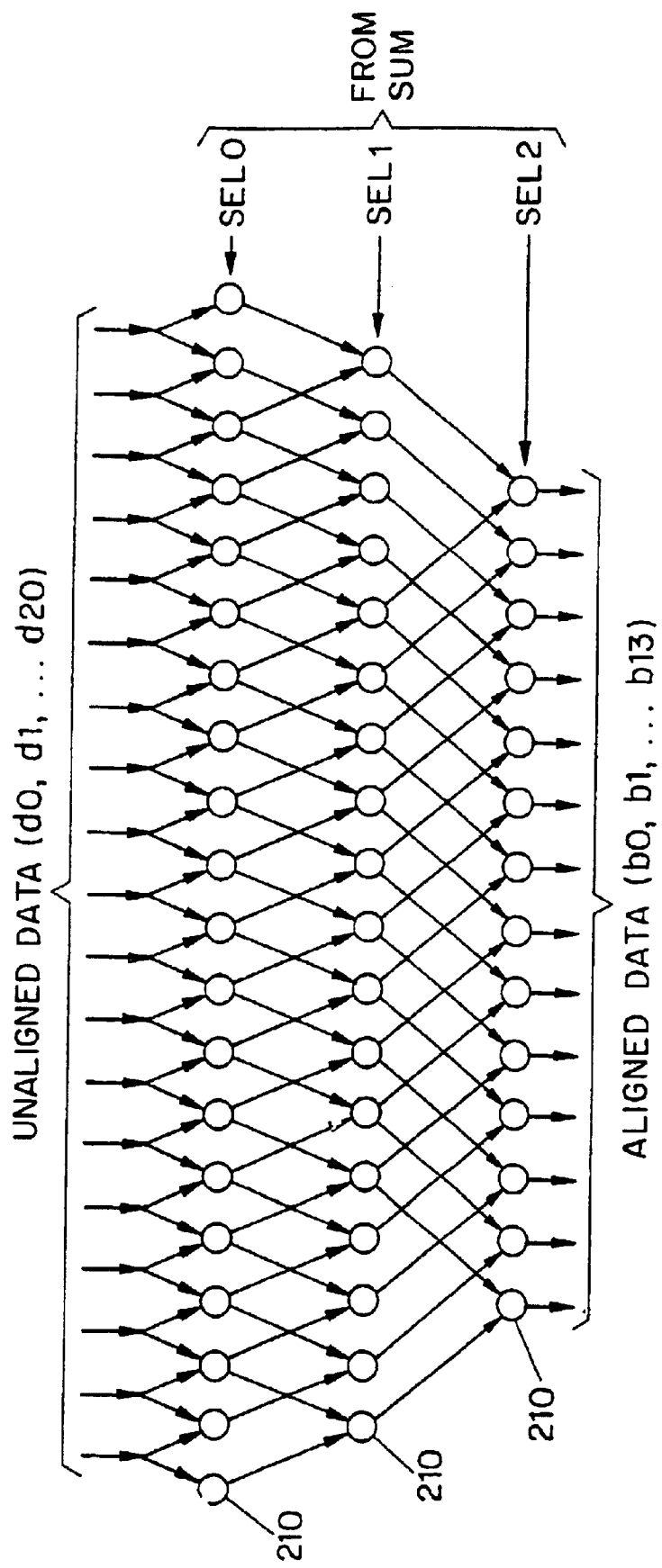
FIG. 16 is a functional block diagram of a preferred embodiment of the align stage of FIGS. 3 and 4.

FIG. 16 shows a functional block diagram of a preferred embodiment of the align stage 200 of the present invention. The align stage is implemented basically as a barrel shifter with dual-rail inputs and outputs. The barrel shifter of FIG. 16 comprises three stages of 2:1 multiplexers 210. The barrel shifter selects 14 bits of the 21 bits from the input buffer depending on the value of the dual-rail inputs sel0, sel1, and sel2, which are the outputs of the sum stage.

Figure 17:
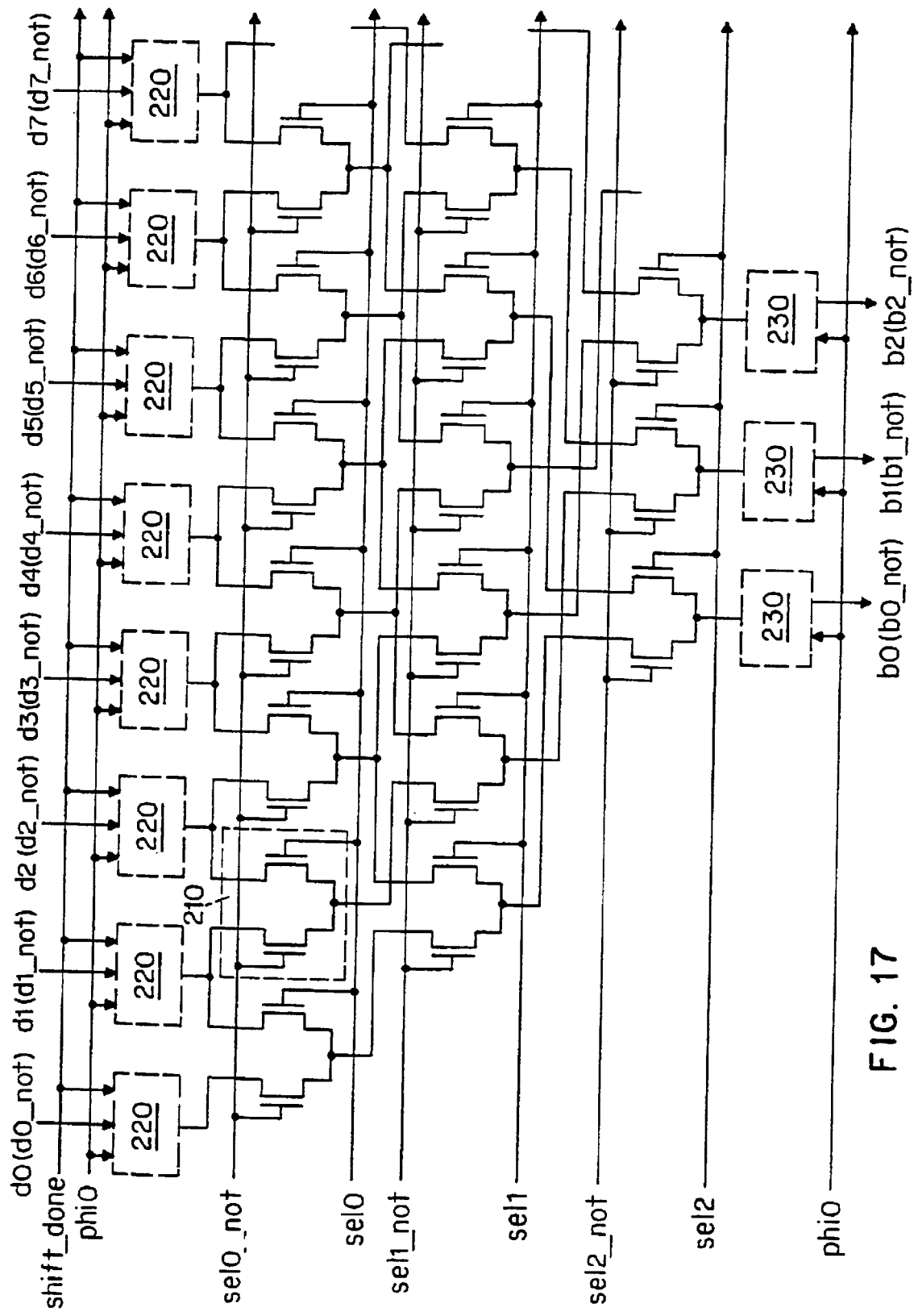
FIG. 17 is a partial schematic diagram of a preferred embodiment of the barrel shifter of FIG. 16.
Figure 18:
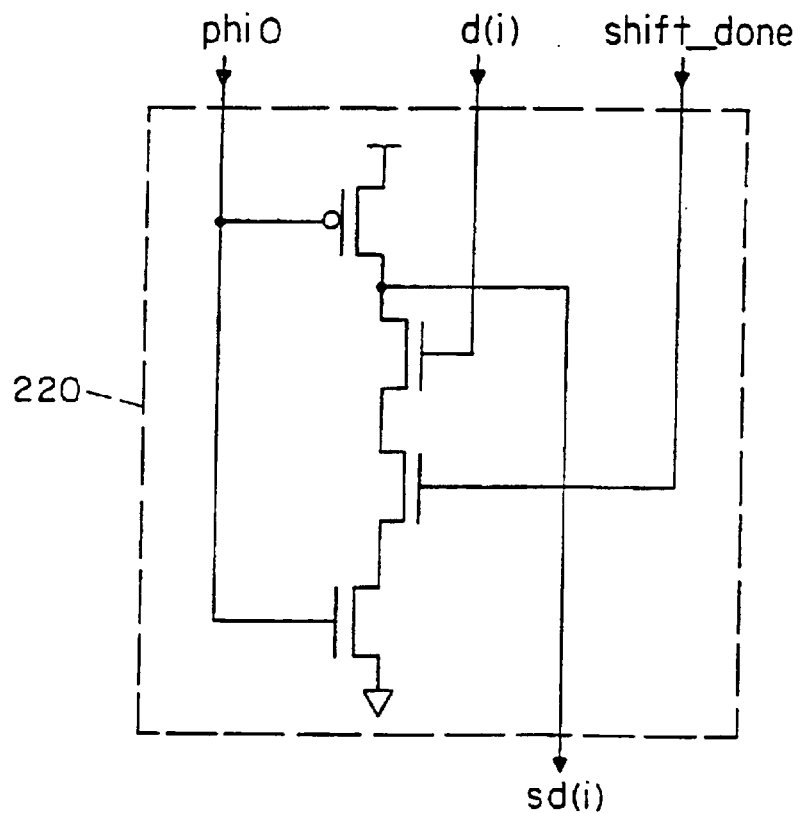
FIG. 18 is a schematic diagram of a preferred embodiment of one of the input buffers of the barrel shifter of FIG. 17.
Figure 19:
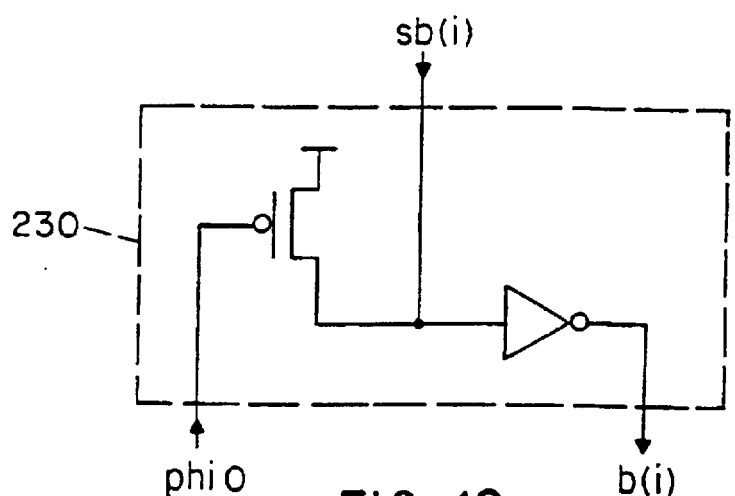
FIG. 19 is a schematic diagram of a preferred embodiment of one of the output buffers of the barrel shifter of FIG. 17.

FIG. 17 shows a partial schematic diagram of a preferred embodiment of the barrel shifter of FIG. 16 (the circuitry for only eight data bits is shown). As shown in FIG. 17, each of the 2:1 multiplexers 210 of the barrel shifter is implemented simply as two n-channel transistors, with the sources of the transistors serving as data inputs, the bases serving as control inputs, and the drains connected together and serving as the output. FIG. 17 also shows that the barrel shifter has a plurality of buffers 220 and 230 on the input and output stages, respectively, of the multiplexer network. Each buffer 220, which is shown in detail in FIG. 18, passes valid data to the multiplexers only when phi0 and shift_done are both high. Each buffer 230, which is shown in detail in FIG. 19, passes valid data from the multiplexers to the match stage only when phi0 is high. When phi0 is low, the buffers 220 and 230 are in precharge mode.

Once the align stage 200 has removed the appropriate number of bits from the input data, the aligned data (b0:b13) must be parsed to determine the length of the next Huffman code. To simplify this parsing, it is preferred to take advantage of the flexibility of Huffman codes when they are assigned and to cluster them into match classes.

On the one hand, the length of each Huffman code is precisely determined by the frequency distribution of the original input alphabet. On the other hand, the actual bit encoding for each input symbol is flexible, as long as the prefix property and the code length requirements of Huffman codes are maintained. The preferred approach, therefore, is to select code words of a given length such that those code words contain as many common bits as possible, which are unique to that group of code words. For example, note that all of the five-bit long Huffman codes shown in Table 1 contain the string "010" as the initial three bits, while no other code words contain those values in those positions. This allows use of that substring in that position to define a class of 5-bit code words and allows use of the remaining bits to enumerate the members of that class. In many cases, the coding can be structured such that only a small number of bits are required to be tested in order to determine the length of the Huffman code.

Overall, for the coding shown in Table 1, the 256 different code words are grouped into 31 distinct classes. This grouping of classes is shown in Table 2, along with the qualifying bit patterns for each class and the enumerating bits used to distinguish the class members. The matching process starts from the top and examines each pattern in turn until a match is found. In Table 2, a dash ("–") means a "don't care" (assuming that no higher match in Table 2 has occurred) and a period denotes an enumerating bit.

TABLE 2

Class Match Logic

| Class | Matching Bit Pattern (b0 . . . b13) | Length |
|---|---|---|
| 0 | 00 | 2 |
| 1 | 0-0.. | 5 |
| 2 | 0--... | 6 |
| 3 | -000.. | |
| 4 | -00-... | 7 |
| 5 | -0-00.. | |
| 6 | -0-0-0. | |
| 7 | -0-0--0 | |
| 8 | -0-..... | 8 |
| 9 | --00.... | |
| 10 | --0-00.. | |
| 11 | --0-..... | 9 |
| 12 | ---00.... | |
| 13 | ---0-0... | |
| 14 | ---0--00. | |
| 15 | ---0--0-0 | |
| 16 | ---0--.... | 10 |
| 17 | ----0..... | |
| 18 | -----00000 | |
| 19 | ------0..... | 11 |
| 20 | ------00... | |
| 21 | ------0-00. | |
| 22 | ------0-0-0 | |
| 23 | ------0-.... | 12 |
| 24 | -------0.... | |
| 25 | --------0... | |
| 26 | ---------0... | 13 |
| 27 | ----------0.. | |
| 28 | -----------0. | |
| 29 | ------------0 | |
| 30 | -------------. | 14 |

Figure 20:
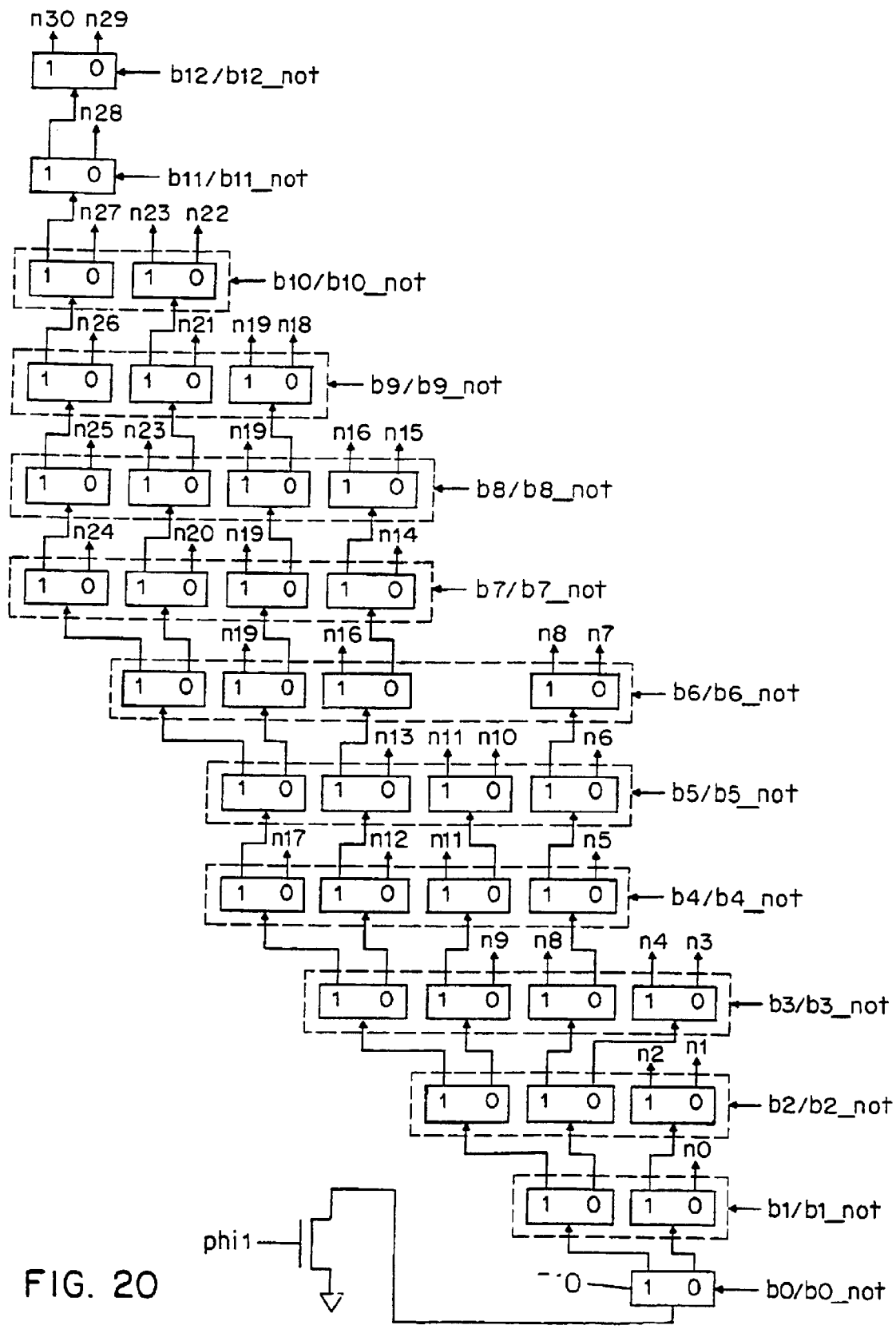
FIG. 20 is a functional block diagram of a preferred embodiment of the class decoding logic for the match stage of FIGS. 3 and 4.
Figure 22:
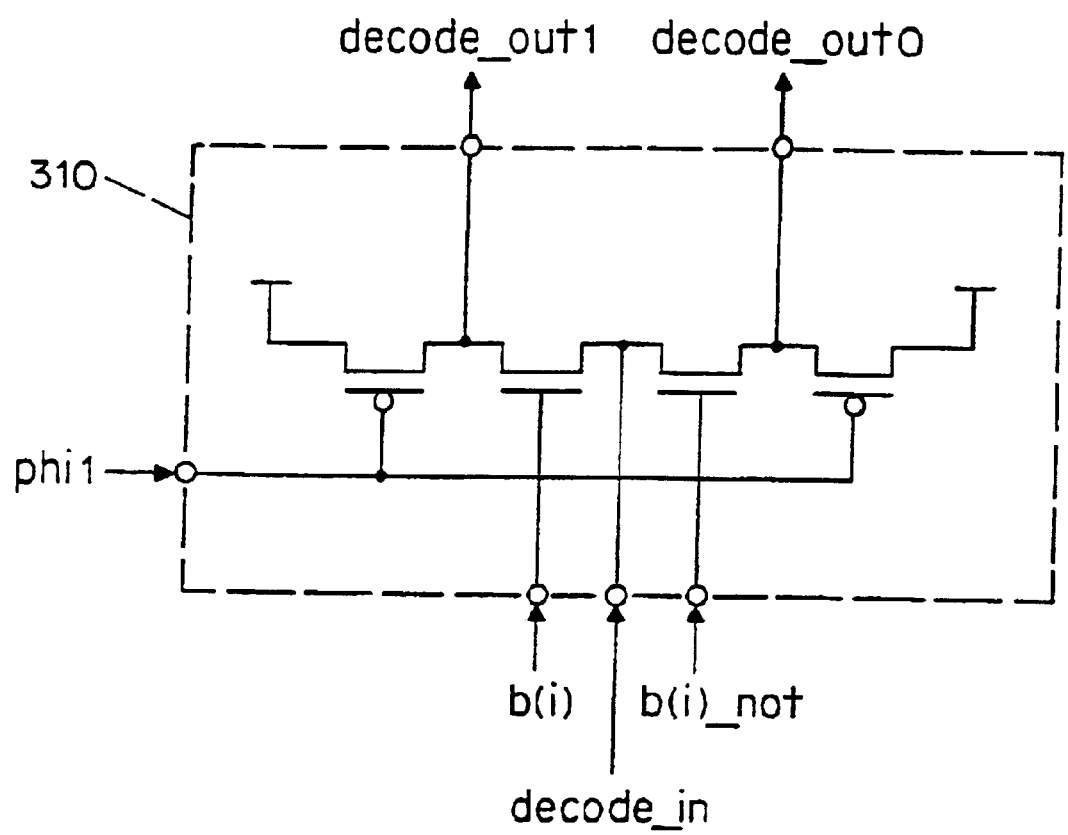
FIG. 22 is a schematic diagram of a preferred embodiment of one of the decoders of FIG. 20.

FIG. 20 shows a functional block diagram of a preferred embodiment of logic for decoding the class of a Huffman code, using the coding of Table 1 and the class match patterns of Table 2. The circuit of FIG. 20 comprises a plurality of decoders 310. Each decoder 310 is shown in greater detail in FIG. 22. The decoder 310 receives a precharge input phi1 (the synchronization signal from the length/PKG stage 410). The decoder 310 precharges when phi1 is low and evaluates its other inputs when phi1 is high. Each decoder 310 receives one bit of the aligned data from the align stage 200, designated as b(i) in FIG. 22. In addition, each decoder 310 receives the complement, b(i)__not, of the aligned data bit b(i). Each decoder 310 also has an enable input, designated decode__in, and two outputs, decode__out0 and decode__out1. After precharge, if decode__in remains high, both decode__out0 and decode__out1 remain high. If decode__in goes low, decode__out0 goes low if b(i) is low and b(i)__not is high, and decod__out1 goes low if b(i) is high and b(i)__not is low.

Figure 21:
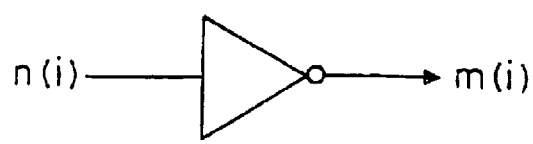
FIG. 21 is a schematic diagram showing a preferred inversion of the outputs of the decoding logic of FIG. 20.

Returning to FIG. 20, the decoders 310 are arranged in a tree-like configuration, with the input decode__in of each decoder being driven by one of the outputs of the decoders in a prior stage, except for the very first decoder at the root of the tree, which is driven by a single n-channel transistor controlled by phi1. When phi1 is high, enabling the first decoder, an enable signal propagates from the root of the tree through each successive stage until an output node is reached. These nodes are designated by the reference symbols n0 through n30. Each output node corresponds to a unique match class. In some cases, a match class may have several output nodes, which are connected in a wire-or circuit. Accordingly, the output nodes of the logic circuit of FIG. 20 are 1-hot, with the low transition of any of the output nodes indicating a completion to the following stages. As shown in FIG. 21, the output nodes of FIG. 20 are inverted before being passed to subsequent stages. The inverted outputs are designated m0 through m30.

Note that the circuit of FIG. 20 is implemented such that the shortest, and thus most common, codes are matched using the fewest levels of logic. Therefore, the average response time for the circuit is much faster than the worst case response time. Because a deep N-channel stack is used to detect matches with the longest code, it is preferred that the bottom three transistors in the stack be widened by two to four times the normal width to improve the performance of the stack.

As shown in FIG. 4, the match stage 300 generates a synchronization signal phi0, which controls previous stages in the self-timed ring. The generation of a completion signal for the match stage is a challenge: because of the highly data-dependent operating speed, it is not practical to use a fixed matched delay. On the other hand, generation of a true completion signal (combining the 31 distinct outputs) would entail excessive hardware overhead. The preferred solution is to defer the completion signal generation for the match stage to the subsequent stage, the length/PKG stage 410, which is discussed next.

Figure 23:
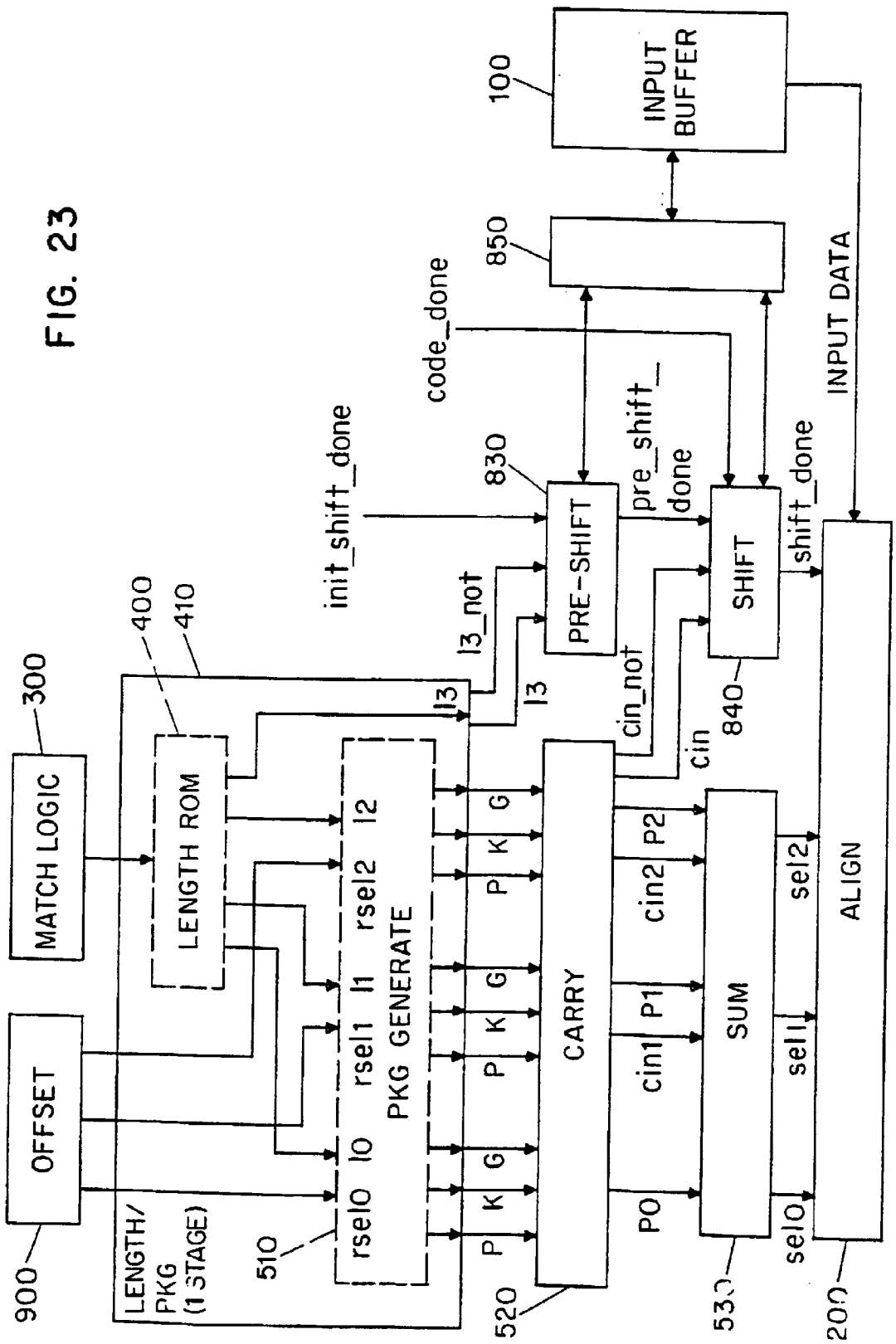
FIG. 23 is a partial block diagram of the decoder of FIG. 4.

As shown in FIG. 4 and FIG. 23, the length/PKG stage 410 includes a length decode ROM 400. The length decode ROM 400 translates the match stage outputs into a four-bit binary representation of the Huffman code length. (Only four bits are needed because the longest Huffman code is fourteen bits). The inputs to the length decode ROM 400 are the 31 one-hot outputs m0 through m30. Thus, each input corresponds to one match class and drives a word line in the ROM. The ROM then produces a 4bit dual-rail output (8 wires), which represents the length of the Huffman code. The outputs are l3, l2, l1, l0 and their complements are l3__not, l2__not, l1__not, and l0__not, respectively.

Figure 24:
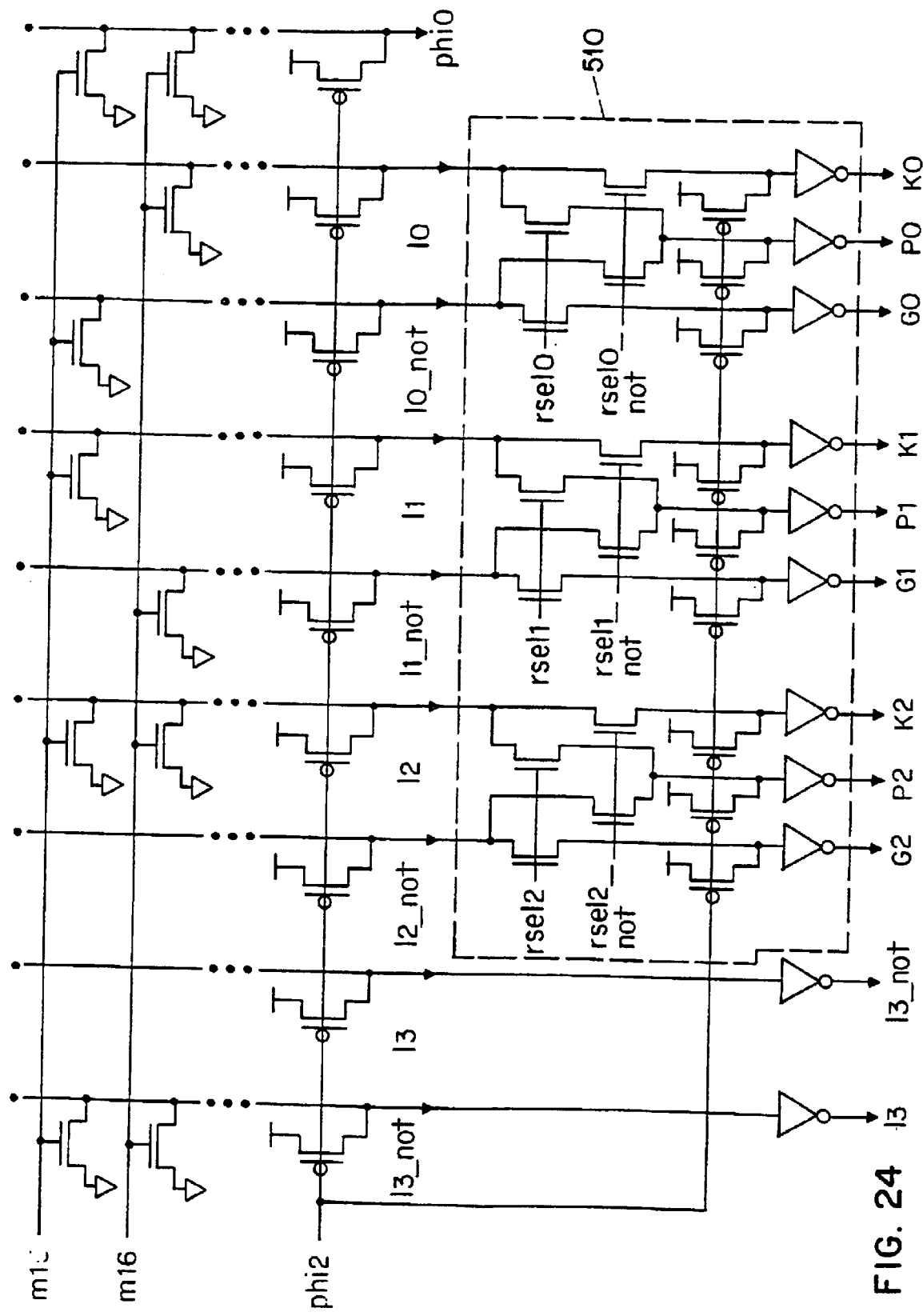
FIG. 24 is a partial schematic diagram of a preferred embodiment of the length decode ROM of FIGS. 3 and 4.

FIG. 24 shows a partial schematic diagram of the length decode ROM 400, showing the word lines of the ROM driven by m15 and m16. These inputs correspond to classes 15 and 16, respectively, which have codes of lengths 9 and 10 bits, respectively. As shown in FIG. 24, phi2 (the synchronization signal from the carry stage 520) drives a word line with p-channel pull-up transistors. When phi2 is low, these transistors precharge and the bit lines are set high. When phi2 is high, bit lines may be driven low by transistors on a word line selected by the outputs from the match stage. For example, if m15 is the hot output, then l3_not, l2, l1, and l0 not will be driven low by the transistors on the m15 word line. The four-bit binary output 1001 represents the code length of nine for class 15.

As shown in FIG. 24, the length decode ROM 400 also has a ninth output phi0. This output is an extra bit line that is enabled by every input and that acts as a matched delay for the ROM. The output phi0 of the length decode ROM 400 is used as the completion signal for the match stage 300. A second delayed version of the phi0 output (not shown in FIG. 24) is used as the completion signal phi1 of the length/PKG stage 410.

FIG. 24 also shows a schematic for a preferred embodiment of the PKG unit 510. As an optimization, the PKG unit 510 of the adder 500 is merged directly into the length decode ROM 400 to form a single length/PKG stage 410. The PKG unit 510 takes two 3-bit operands: the current offset stored in the offset register (rsel2, rsel1, rsel0) and the first three bits of the length decode ROM (l2, l1, l0). Each of these operands is dual rail. For each corresponding pair of operand bits (i.e., rsel2 and l2, rsel1 and l1, and rsel0 and l0), the PKG unit generates a propagate, kill, or generate bit (i.e., the PKG unit generates a propagate bit if the operands are binary 01 or binary 10, a kill bit if the operands are binary 00, and a generate bit if the operands are binary 11). The result is output on three sets of three one-hot output wires: G2/P2/K2, G1/P1/K1, and G0,P0,K0.

Returning to FIG. 23, the outputs of the PKG unit 510 are coupled to the carry unit 520. The carry unit 520 transforms the three-wire PKG outputs from the PKG unit 510 into dual-rail propagate outputs (P2, P1, and P0) and carry-in (cin2, cin1, and cin) outputs. One rail of each propagate output is generated by performing the boolean "OR" of the K and G inputs, and the second rail of each propagate output is produced by passing through the P input.

The sum unit 530 receives the P2, P1, P0, cin2, and cin1 outputs of the carry unit 520. The sum unit 530 computes a three-bit sum sel2, sel1, and sel0, which is used by the align stage 200.

For each Huffman code that is decoded, the code must be retired from the input data stream. Although it is possible to use a sufficiently long barrel shifter in the align unit 200 to remove each Huffman code, to simplify the hardware, a two-step removal process is preferably used. The removal process includes a shift unit 800 (FIG. 3) in addition to the align unit 200. The shift unit 800 shifts the input buffer by an integral number of bytes (either zero, one, or two). Since a residual misalignment of one to seven bits may still occur (since the input buffers are implemented with eight-bit registers), the align unit adjusts the input data by the remaining offset, as determined by the sum unit 530.

As shown in FIG. 4, the shift unit 800 is preferably implemented in four stages: the initialization stage 810, the initialization-shift stage 820, the pre-shift stage 830, and the final shift stage 840. The initialization stage 810 and the initialization-shift stage 820 are used only for the initial loading of input data at the start of a new decode request. As shown in FIG. 23, the pre-shift stage 830 receives the most significant dual-rail bit (l3/l3_not) of the output of the length decode ROM 400. Whenever the current Huffman code has a length of eight bits or greater, as indicated by l3/l3_not, at least a one-byte shift of the input buffer 100 is required. The final shift stage 840 is used to implement a second byte shift when the sum of the value in the offset register and the length of the current Huffman code is greater than seven. Preferably, the byte shift of the final shift stage 840 is initiated by the upper carry output (cin/cin_not) of the carry unit 520. In this way, there is no need for the final shift stage 840 to wait until the sum unit 530 completes its operation.

Figure 25:
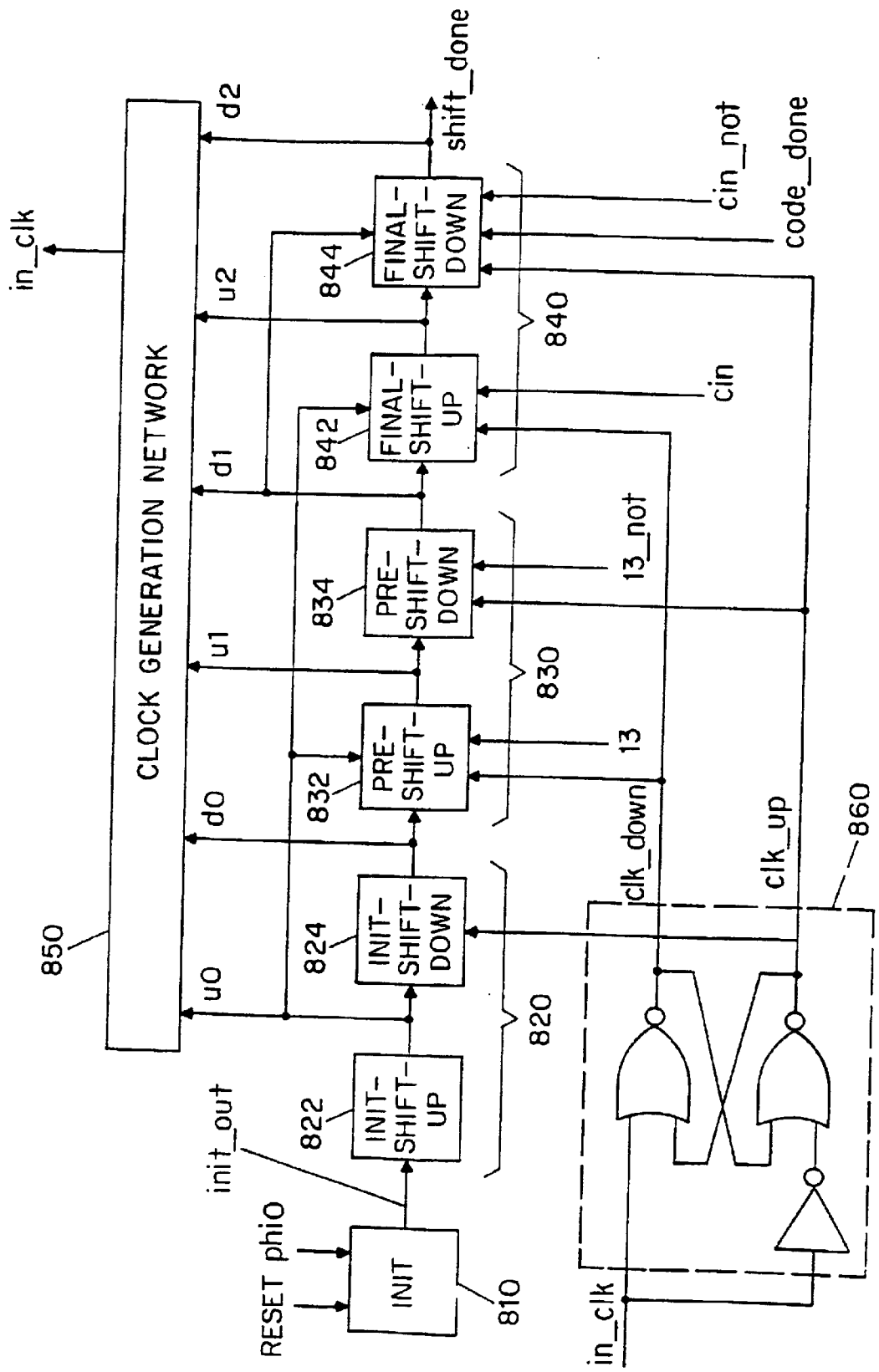
FIG. 25 is a functional block diagram of a preferred embodiment of the shift unit of FIGS. 3 and 4.

FIG. 25 shows a detailed functional block diagram of the shift unit 800. In FIG. 25, the initialization-shift unit 820, pre-shift unit 830, and final-shift unit 840 are divided into two stages each, producing a total of seven stages for the shift unit: the initialization stage 810, the init-shift-up stage 822, the init-shift-down stage 824, the pre-shift-up stage 832, the pre-shift-down stage 834, the final-shift-up stage 842, and the final-shift-up 844. The outputs of the last six stages are designated u0, d0, u1, d1, u2, and d2, respectively. These outputs are received by a clock generation network 850, which produces the signal in_clk. The signal in_clk is used to clock the registers of the input buffer 100.

Each "up" stage produces a high transition of in_clk and each "down" stage produces a low transition of in_clk. The signal in_clk is then fed to the input of an RS latch 860, which produces the feedback signals clk_up and clk_down to the shift stages. The RS latch 860 is used to eliminate potential hazards in the feedback loop of the in_clk signal.

The logic for each stage is preferably implemented in dynamic domino logic. Table 3 lists the logic conditions necessary for the high/low states of the outputs for each shift stage. In the table, the input phi_shift is simply an inverted version of shift_done (which, in turn, is simply the output d2). It should be noted that the last stage (final-shift-down) serves as the synchronization point of the shift and the symbol decode ROM threads—i.e., except during initialization, shift_done will not go high until the symbol decode ROM thread is complete, as indicated by code_done going high.

The functional logic of the clock generation network 850 is given in Table 4.

TABLE 3

Logic for the Shift Stages

| Stage | Output = 0 | Output = 1 |
|---|---|---|
| Initialization | phi0 = 1 | reset = 0 |
| Init-Shift-Up | phi_shift = 0 | phi_shift * init_out = 1 |
| Init-Shift-Down | phi_shift = 0 | phi_shift * clk_up * u0 = 1 |
| Pre-Shift-Up | phi_shift = 0 | phi_shift * clk_down * (u0 * d0 + l3) = 1 |
| Pre-Shift-Down | phi_shift = 0 | phi_shift * (clk_up * u1 + l3_not) = 1 |
| Final-Shift-Up | phi_shift = 0 | phi_shift * clk_down * (u0 * d1 + cin) = 1 |
| Final-Shift-Down | phi4 = 0 | phi4 * (code_done * (u2 * clk_up + d1 * cin_not) + u0 * u2 * clk_up) = 1 |

TABLE 4

Logic for the Clock Generation Network

| In_Clk = 0 | In_Clk = 1 |
|---|---|
| $\overline{u1}*d0 + \overline{u2}*d1 + d2 + reset = 1$ | $u0*\overline{d0} + u1*\overline{d1} + u2*\overline{d2} = 1$ |

Once a Huffman code has been mapped to a particular class, the actual fixed-length output symbol corresponding to that code must be generated. A symbol decode stage 600 (FIG. 3) is used to perform the translation. The symbol decode stage 600 is divided into three stages, as shown in FIG. 4: the decode logic stage 610, the decode ROM stage 620, and the merge stage 630.

The decode ROM 620 is a ROM memory containing 256 word lines—i.e., one word line for each fixed-length output symbol. The decode ROM 620 contains eight bits lines for each fixed-length output symbol and an extra bit line, which acts as a completion signal. Preferably, for increased performance, the completion signal is pulled down by the m0 output of the match stage. The m0 output corresponds to the symbol zero. Since the output of the ROM and merge stage are already zero during precharging, there is no need to perform any further computations when m0 is asserted.

Figure 29:
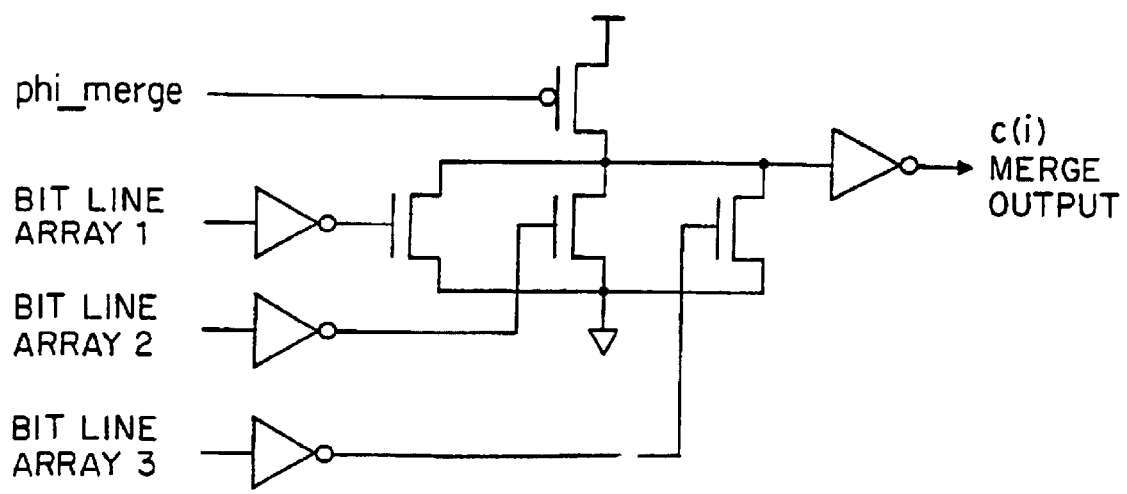
FIG. 29 is a schematic diagram of a preferred embodiment of the merge stage of FIG. 4.

The implementation of the decode ROM is similar to that of the length decode ROM 400. Preferably, to optimize performance, the decode ROM 620 may be divided into smaller arrays. For example, three arrays of 86 word lines may be used. The outputs of these arrays are then merged in the merge stage 630. FIG. 29 shows a schematic diagram showing the merging of three corresponding bit lines from three arrays. The transistor circuit performs a boolean "OR" operation of the three inputs. The circuit has a p-channel pull-up transistor, which precharges when phi_merge is low.

The ROM select lines of the decode ROM 620 are driven by the outputs of the decode logic stage 610. The decode logic stage 610 produces the 256 one-hot ROM select lines using the outputs of the match stage 300 and the enumerating bits from the align stage 200.

Referring to Table 2, it is easy to see that a separate decoder may be used for each class, each decoder taking as inputs one of the match stage outputs and the appropriate enumerating bits from the align stage 200. It should be noted, however, that multiple classes use the same enumerating bits. Thus, it is more efficient to combine some of the decoding logic for various classes. For example, class 4 needs a decoder that decodes bits b4, b5, and b6, and class 5 needs a decoder that decodes bits b5 and b6. If each decoder is implemented as a tree of 1:2 decoders, then a b5-b6 decoder is part of a b4-b5-b6 decoder.

Figure 26:
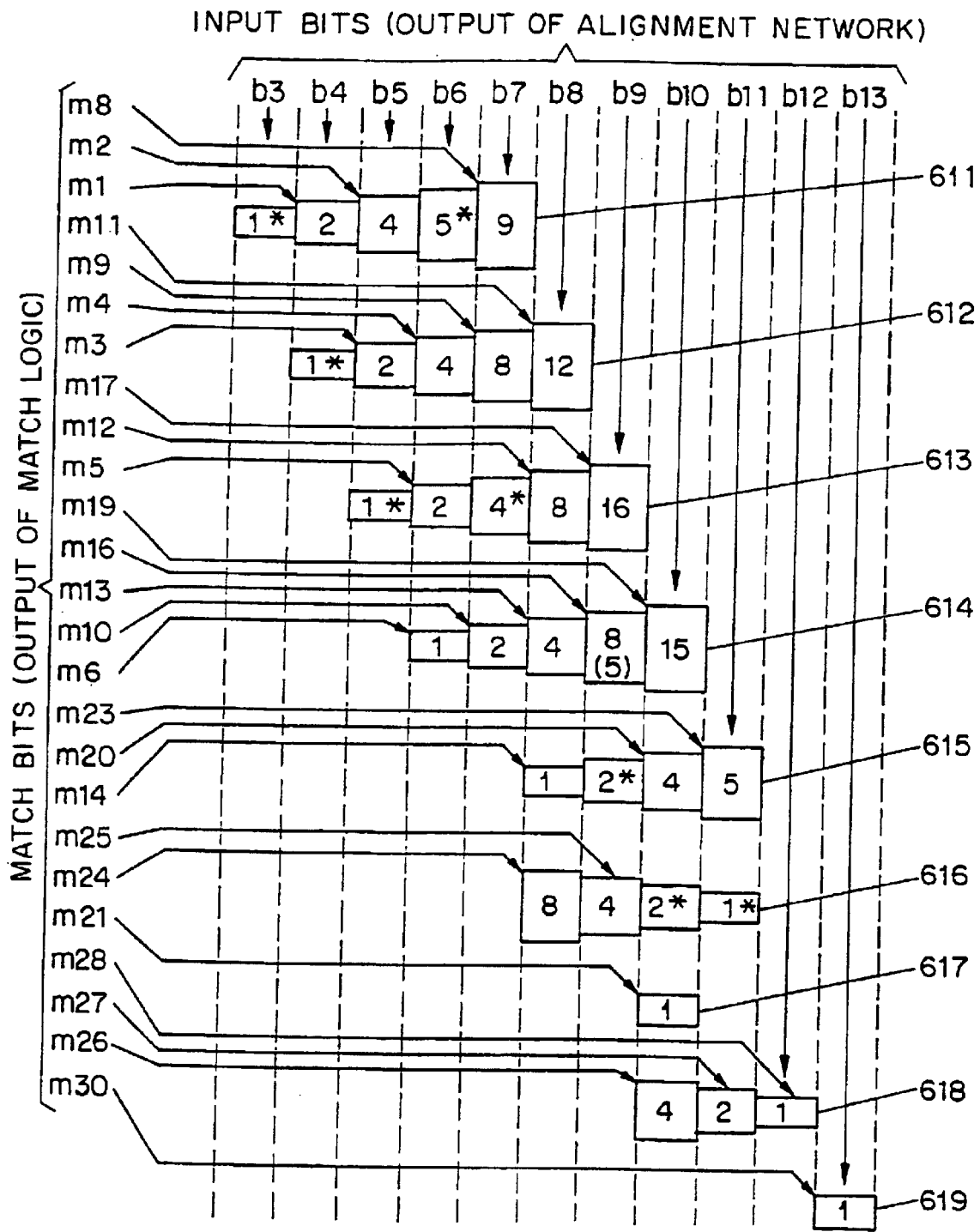
FIG. 26 is a block diagram of a preferred embodiment of the symbol decode logic stage of FIG. 4.

FIG. 26 shows a block diagram of a preferred embodiment of the decode logic stage 610, in which the logic has been arranged as nine decoder groups 611 to 619. Each group contains one or more decoder levels, as represented by the boxes in each group. Each number in a decoder level box represents the number of 1:2 decoders in that decoder level. Each group decodes from the smallest decoder level to the largest decoder level.

All of the decoders in FIG. 26 produce symbol ROM select lines except for those decoders in boxes containing an asterisk. Moreover, with regard to the decoders in the box receiving the m16 input in group 614, only five of the eight decoders in that decoder level produce ROM select lines. It should also be noted that the match outputs m0, m7, m15, m18, m22, and m29 are not used as inputs to any of the decoders in FIG. 26. These outputs are used directly as ROM select lines because the classes represented by these outputs each have only one member.

Preferably, the decoding of the enumerating bits from the align stage 200 is performed in parallel with the decoding process of the match stage 300. Then, the outputs of the match stage 300 are used as enable signals to the decoders of FIG. 26.

Figure 27:
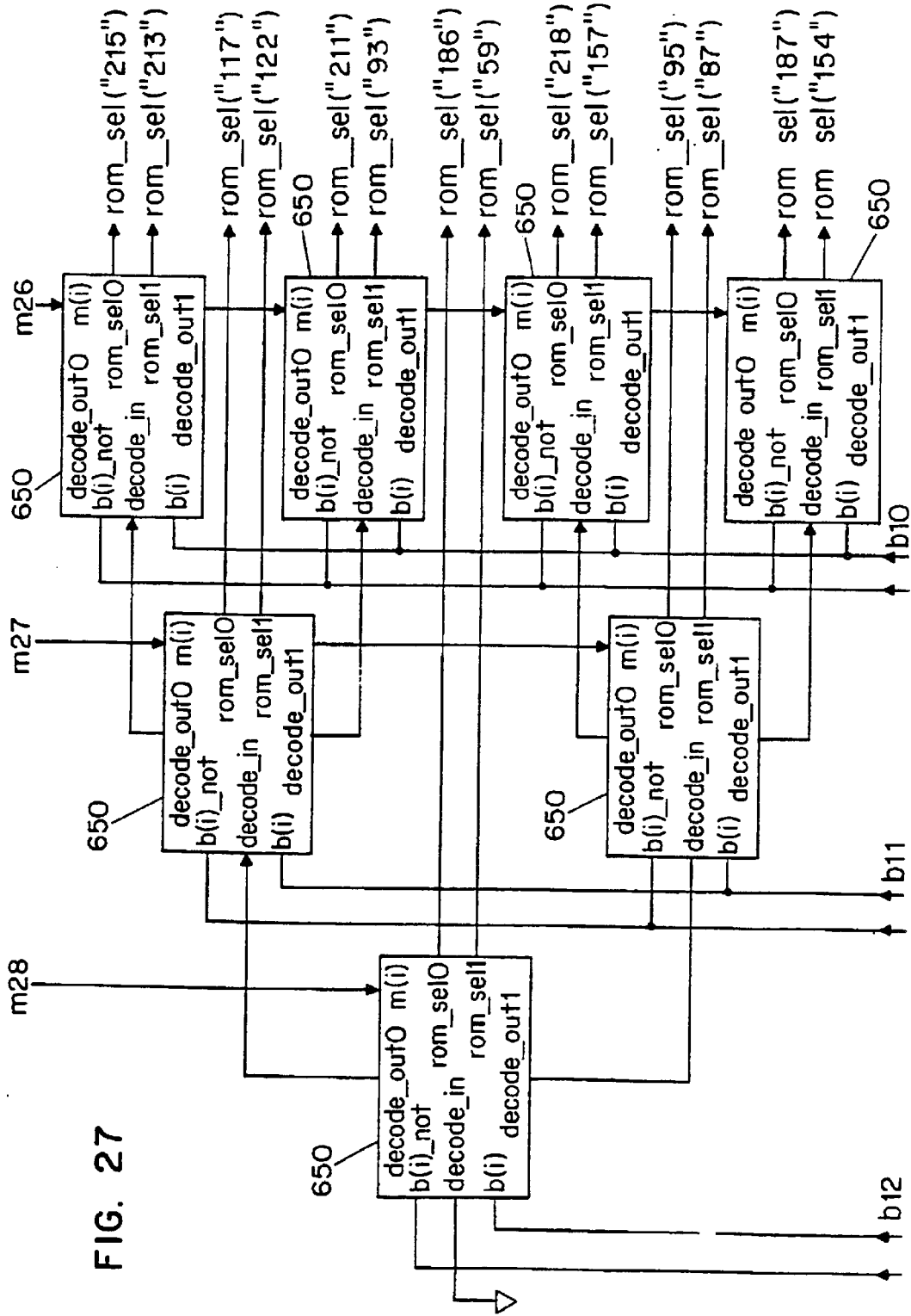
FIG. 27 is a functional block diagram of a decoder group of FIG. 26.

FIG. 27 shows a more detailed functional block diagram of the decoder group 618 of FIG. 26. Group 618 contains three levels of decoders, the first level containing one decoder 650, the second level containing two decoders 650, and the third level containing four decoders 650.

Figure 28:
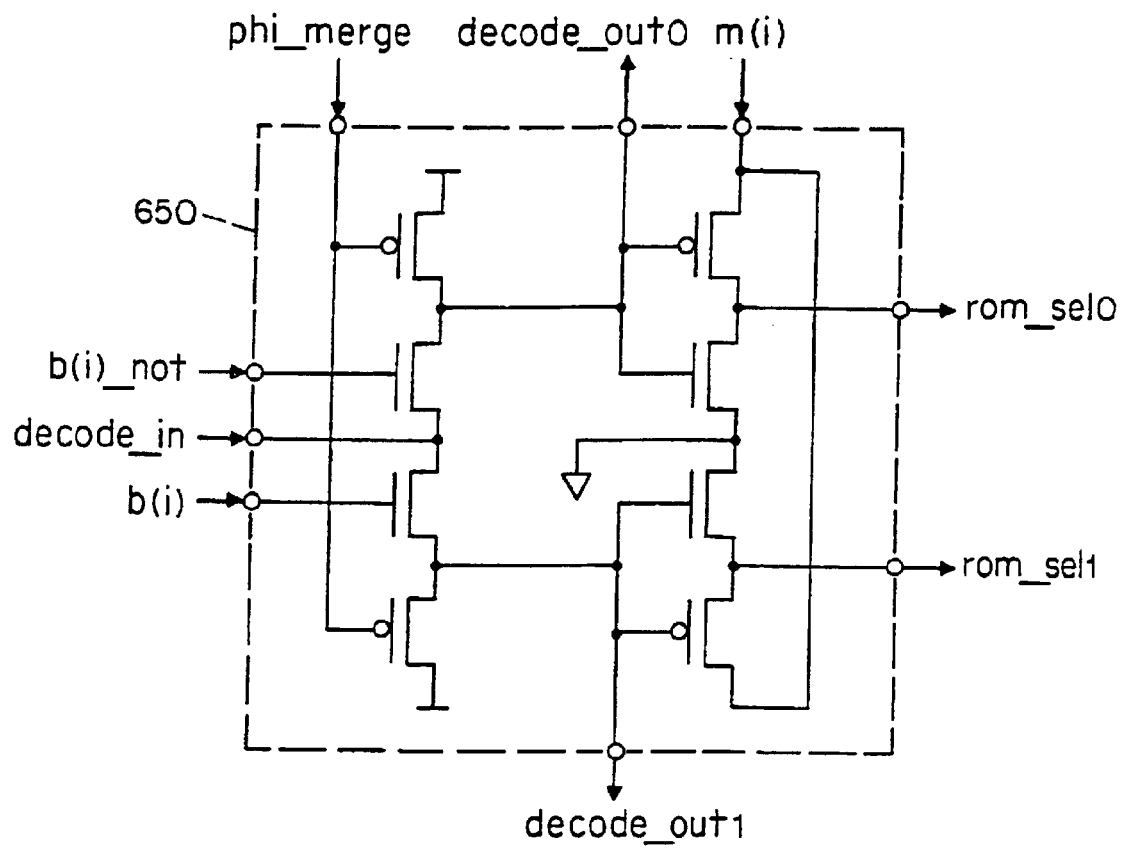
FIG. 28 is a schematic diagram of a preferred embodiment of one of the decoders of FIG. 26 and 27.

FIG. 28 shows a schematic diagram a preferred embodiment of a decoder 650. The input phi_merge from the merge stage 630 (which is simply an inverted code_done) acts as a precharge input for the decoder. The decoder also has a dual-rail data input, b(i)/b(i)_not, and an enable input, decode_in, which is either grounded or driven by a decoder in a previous level. When decode_in is low (and phi_merge is high), one of the outputs decode_out0 and decode_out1 will be driven low depending on the value of b(i). Furthermore, when decode_in is low and m(i) is high, one of the outputs rom_sel0 and rom_sel1 is driven high depending on the value of b(i).

Figures 30, 31:
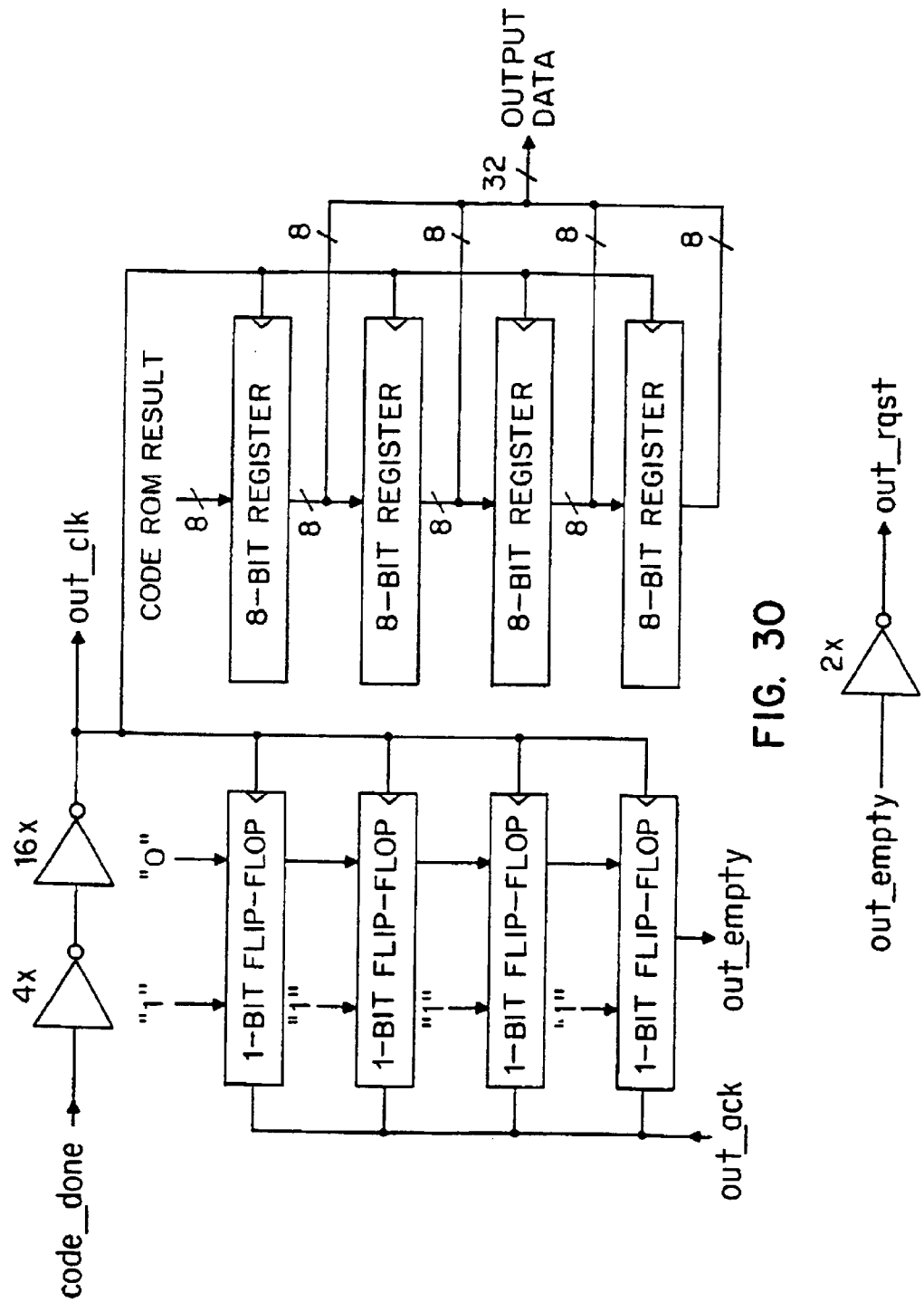
FIG. 30 is a functional block diagram of a preferred embodiment of the output buffer of FIGS. 3 and 4.
FIG. 31 is a schematic diagram of a preferred embodiment of the handshaking circuit of FIGS. 3 and 4.

FIG. 30 shows a functional block diagram of a preferred embodiment of the output buffer 700. The output buffer contains four 8-bit registers connected in series. The results from the symbol decode ROM and merge stage are clocked into the registers by out_clk, which is a buffered version of code_done. When four bytes are ready, the bytes are transmitted to the cache as a 32-bit word.

The output buffer 700 also has four 1-bit status registers, which are also clocked by out_clk. The status registers are loaded with a "1" when the cache acknowledges the receipt of data (i.e., when the cache asserts out_ack). Subsequently, as the status registers are clocked by out_clk, a "0" is propagated from the first register to the last register. The output of the last register is the signal out_empty, which indicates that the output buffer is ready to transmit another 32-bit word.

FIG. 31 shows a schematic diagram of the handshaking circuit 750. The signal out_rqst is simply an inverted version of out_empty.

Figure 32:
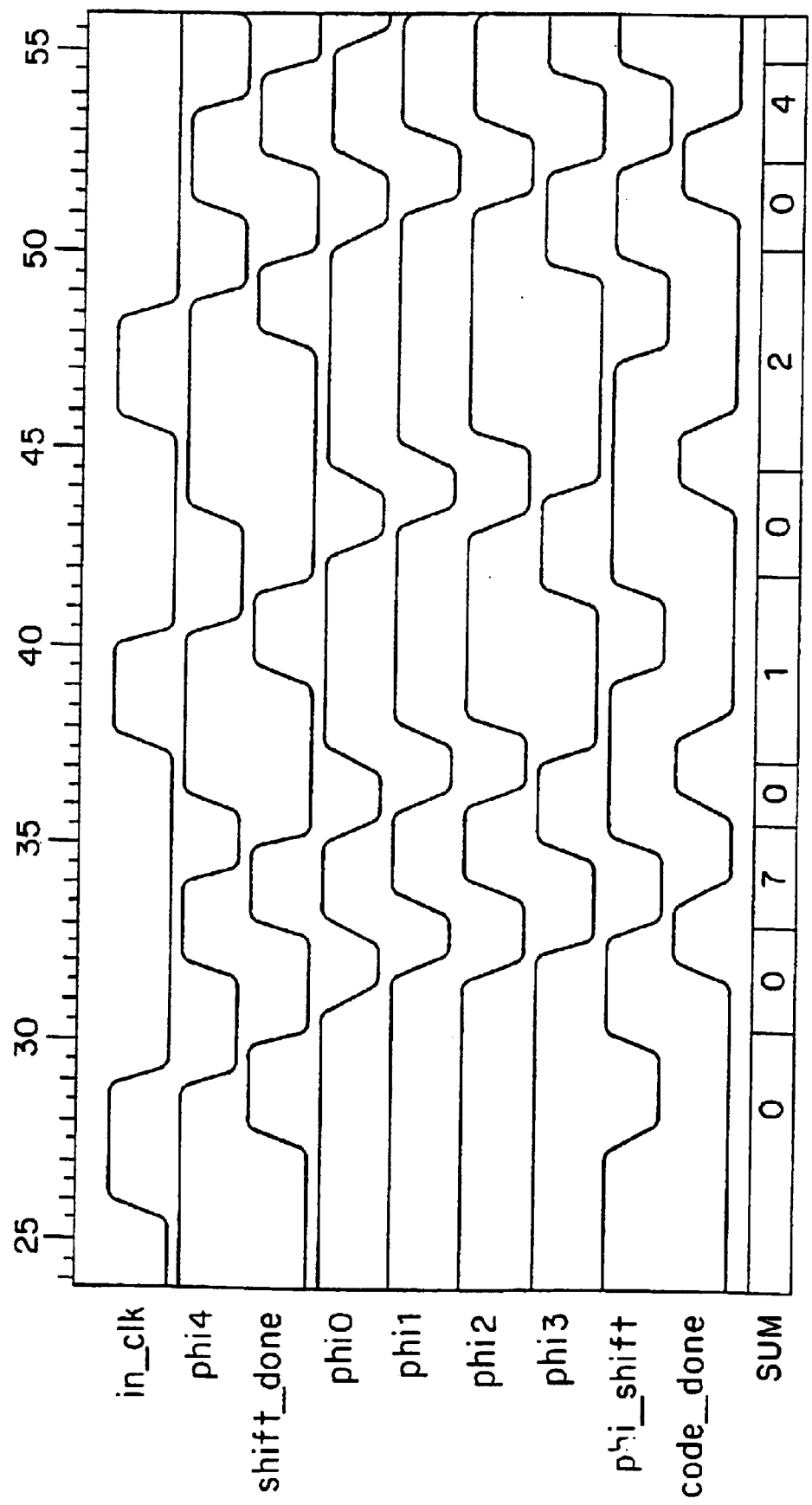
FIG. 32 is an exemplary timing diagram in accordance with the invention.

FIG. 32 shows a timing diagram associated with a sample decoding process involving four Huffman codes having lengths of seven, two, nine, and two bits, respectively. Initially, all of the synchronization signals (pbi0, phi1, phi2, phi3, phi4, and phi_shift) are high, indicating that all precharge inputs have been released and inputs are ready to be evaluated. The output of the sum unit is initially zero. It is assumed that the first in_clk shifts the first Huffman code into the last register of the input buffer.

The falling sequence of the signals phi4 and phi0 through phi3 indicates the completion of the align stage through the sum stage. When sum is complete, as indicated by the falling edge of phi3, a new offset value of seven is produced. Since the initial value of sum (as stored in the offset register) was zero, there is no carry and no shifting of the registers in the input buffer is needed. Therefore, the first cycle is complete.

The zero-overhead operation of the circuit should be noted: once the sum stage is complete (phi3 goes low), the shift stage is complete (shift done goes high), and the precharge of the align stage is released (phi0 goes high), the next iteration can begin immediately. It should also be noted that the symbol decode ROM and merge stage completion signal (code_done) enables the shift completion signal (shift_done), illustrating a synchronization of parallel threads (see FIG. 4). It should further be noted that the output of the sum stage is a zero during precharge, i.e., when phi4 is low.

In the second cycle, the new input symbol has length 2. Since the sum of seven plus two is greater than eight, the shift stage generates a one-byte shift of the input buffer and the sum stage produces a new offset value of one. The second in_clk indicates the one-byte shift operation. The remaining input symbols in the example have bit lengths of nine and two, resulting in sum values of two and four, respectively. The variable timing of the code_done waveform should be noted, which indicates the data-dependent generation and writing of individual byte output symbols into the output buffer.

Advantageously, the performance of a Huffman decoder according to the present invention is estimated to be faster than comparable synchronous Huffman decoders, after normalizing for technology and voltage. At the same time, the area of the design is five to ten times smaller than most synchronous designs.

Although the present invention has been described with reference to certain preferred embodiments, various modifications, alterations, and substitutions will be known or obvious to those skilled in the art without departing from the spirit and scope of the invention, as defined by the appended claims. For example, although the preferred embodiments have been described with respect to Huffman-coded data, the present invention may be used with any variable-length coded data.

What is claimed is:

1. A decoder circuit comprising:
   an input buffer for receiving input data coded using a variable-length coding technique;
   a logic circuit coupled to the output of said input buffer comprising a plurality of computational logic stages for decoding said input data, said plurality of computational logic stages arranged in one or more computational threads, at least one of said computational threads being arranged as a self-timed ring wherein each computational logic stage in said ring produces a completion signal indicating either completion or non-completion of said computation logic stage, the completion signal of each computational logic stage being coupled to a previous computational logic stage in said ring, said previous computational logic stage performing control operations when said completion signal indicates completion and performing evaluation of its inputs when said completion signal indicates non-completion; and
   an output buffer coupled to the output of said logic circuit.

2. A decoder circuit comprising:
   an input buffer for receiving input data comprising coded, variable-length data words;
   an alignment circuit coupled to the output of said input buffer for shifting said input data by an amount responsive to a control input;
   a first logic circuit coupled to the output of said alignment circuit for decoding said coded, variable-length data words;
   a second logic circuit coupled to the output of said alignment circuit for determining the length of said coded, variable-length data words;
   a register;
   an adder circuit coupled to the output of said register and the output of said second logic circuit, the output of said adder circuit coupled to the input of said register and to the control input of said alignment circuit; and
   an output buffer coupled to the output of said first logic circuit;
   wherein said alignment circuit, second logic circuit, and said adder circuit are logically partitioned into a plurality of computational stages arranged in a computation thread, each of said computational stages having associated therewith a completion circuit for producing a completion signal indicating the completion or non-completion of each computational stage, each said completion signal being coupled to a previous computational stage, each said previous computational stage performing control operations when said completion signal indicates completion and performing evaluation of its inputs when said completion signal indicates non-completion.

3. The decoder of claim 2, wherein each of said computational stages is implemented in dynamic logic and said control operations include precharging.

4. The decoder of claim 2, wherein said alignment circuit is a barrel shifter.

5. The decoder of claim 2, wherein said input buffer comprises a plurality of registers connected in series, said adder circuit produces a carry output, and said first logic circuit produces a completion signal after each of said coded, variable-length data words are decoded, and further comprising a shift circuit coupled to said carry output of said adder circuit and said completion signal of said first logic circuit, said shift circuit producing a control signal output for clocking said plurality of registers of said input buffer.

6. The decoder of claim 5, wherein said shift circuit produces a completion signal that is coupled to said alignment circuit.

7. The decoder of claim 5, wherein said shift circuit comprises a pre-shift circuit and a final-shift circuit, said pre-shift circuit being coupled to one or more significant bits of the output of the second logic circuit and said final-shift circuit being coupled to said carry output of said adder.

8. The decoder of claim 2, wherein each of said coded, variable-length data words are associated with a class, all of the members of said class having the same word length and a plurality of common bits, said plurality of common bits being unique to each class, and wherein said second logic circuit comprises a match class circuit for determining the class associated with each of said coded, variable-length data words.

9. The decoder of claim 8, wherein said first logic circuit is coupled to the output of said match class circuit.

10. The decoder of claim 8, wherein said match class circuit comprises a plurality of decoders arranged in a tree structure.

11. The decoder of claim 2, wherein said adder circuit is a look-ahead carry adder comprising a PKG circuit, a carry circuit coupled to said PKG circuit, and a sum circuit coupled to said carry circuit.

12. The decoder of claim 2, wherein each completion circuit is a matched delay for its associated computational stage.

13. A compressed code microprocessor system comprising:
   a microprocessor;
   a memory having stored therein program instructions compressed using a variable-length coding technique, said program instructions being executable in said microprocessor; and
   a decompression circuit coupled in asynchronous communication with said microprocessor and said memory, said decompression circuit comprising an input buffer for receiving compressed program instructions from said memory; a logic circuit coupled to the output of said input buffer comprising a plurality of computational logic stages for decompressing said compressed program instructions; said plurality of computational logic stages arranged in one or more computational threads, at least one of said computational threads being arranged as a zero-overhead self-timed ring wherein each computational logic stage in said ring produces a completion signal indicating either completion or non-completion of said computation logic stage, said completion signal being coupled to a previous computational logic stage in said ring, said previous computational logic stage performing control operations when said completion signal indicates completion and performing evaluation of its inputs when said completion signal indicates non-completion; and an output buffer coupled to the output of said logic circuit for transmitting decompressed program instructions.

14. The compressed code microprocessor system of claim 13, further comprising a cache coupled to said microprocessor and said decompression circuit.

* * * * *